(12) United States Patent
Kanda et al.

(10) Patent No.: US 7,759,628 B2
(45) Date of Patent: Jul. 20, 2010

(54) DETECTION DEVICE AND ELECTRONIC APPARATUS HAVING PLURAL SCANNING LINES, DETECTION LINES, POWER SUPPLY LINES AND PLURAL UNIT CIRCUITS ARRANGED ON A SUBSTRATE

(75) Inventors: Eiji Kanda, Suwa (JP); Ryoichi Nozawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 12/133,068

(22) Filed: Jun. 4, 2008

(65) Prior Publication Data

US 2008/0315068 A1  Dec. 25, 2008

(30) Foreign Application Priority Data

| Jun. 22, 2007 | (JP) | ............................. 2007-164686 |
| Jun. 22, 2007 | (JP) | ............................. 2007-164687 |
| Jun. 22, 2007 | (JP) | ............................. 2007-164688 |
| Jun. 22, 2007 | (JP) | ............................. 2007-164689 |
| Jan. 30, 2008 | (JP) | ............................. 2008-018646 |
| Jan. 30, 2008 | (JP) | ............................. 2008-018647 |
| Jan. 30, 2008 | (JP) | ............................. 2008-018648 |
| Jan. 30, 2008 | (JP) | ............................. 2008-018649 |

(51) Int. Cl.
*H01J 40/14* (2006.01)

(52) U.S. Cl. ................................. 250/214 R; 250/214.1

(58) Field of Classification Search ............... 250/208.1, 250/214 R, 214.1; 348/297–311; 257/231, 257/290–292; 349/43–46, 149, 187
See application file for complete search history.

(56) References Cited

U.S. PATENT DOCUMENTS 5,386,108 A * 1/1995 Arikawa et al. .......... 250/208.1

FOREIGN PATENT DOCUMENTS

JP    A 4-212458    8/1992

* cited by examiner

*Primary Examiner*—Que T Le
(74) *Attorney, Agent, or Firm*—Oliff & Berridge, PLC

(57) ABSTRACT

A unit circuit includes a first transistor, a detection element, a second transistor, and a first capacitive element. The first transistor supplies a detection line with a detection signal corresponding to the electric potential of a gate electrode thereof. The detection element is connected to the gate electrode of the first transistor and varies the electric potential of the gate electrode of the first transistor in accordance with an external factor. The second transistor has a first terminal that is connected to the gate electrode of the first transistor and a second terminal that is connected to a second power supply line. The second transistor has a gate electrode that is connected to a scanning line. The first capacitive element holds the electric potential of the gate electrode of the first transistor.

20 Claims, 32 Drawing Sheets

DETECTION DEVICE AND ELECTRONIC APPARATUS HAVING PLURAL SCANNING LINES, DETECTION LINES, POWER SUPPLY LINES AND PLURAL UNIT CIRCUITS ARRANGED ON A SUBSTRATE

BACKGROUND

1. Technical Field

The present invention relates to a detection device and an electronic apparatus on which the detection device is mounted.

2. Related Art

The following detection device is known as one of detection devices that are used for a two-dimensional sensor, an image sensor, an optical touch sensor, or the like. That is, the detection device includes a photoelectric conversion element, which serves as a detection element, a capacitive element of which the amount of charge stored varies in accordance with the amount of light that the photoelectric conversion element receives, and a transistor, and is configured to read the amount of charge stored in the capacitive element by on/off operation of the transistor, which is, for example, described in JP-A-4-212458.

In addition, when the photoelectric conversion element is replaced with a storage capacitor in the above configuration, the amount of charge stored in the capacitive element varies in accordance with an increase or decrease in the amount of charge stored in the storage capacitor due to an external factor. The detection device may also be configured to use a storage capacitor as a detection element as described above.

The above detection device improves its detection resolution as the density in which detection elements are arranged increases. However, if various components including transistors and wirings connected to terminals of the transistors are intended to be arranged in high density, there is a problem that the characteristics of the transistors deteriorate or variation in the characteristics increases. Furthermore, there is also a problem that, because of a complex wiring structure, a signal delay occurs or yields are decreased.

SUMMARY

An advantage of some aspects of the invention is that it may be implemented as the following aspects or application examples.

FIRST APPLICATION EXAMPLE

A detection device includes a substrate, and includes a plurality of scanning lines, a plurality of detection lines, a plurality of first power supply lines, a plurality of second power supply lines and a plurality of unit circuits, which are arranged on the substrate. The plurality of unit circuits are provided at positions corresponding to intersections of the scanning lines and the detection lines. Each of the unit circuits includes a first transistor, a detection element, a second transistor, and a first capacitive element. The first transistor has a first terminal that is connected to a corresponding one of the detection lines and a second terminal that is connected to a corresponding one of the first power supply lines. The first transistor supplies the corresponding one of the detection lines with a detection signal corresponding to the electric potential of a gate electrode thereof. The detection element is connected to the gate electrode of the first transistor and varies the electric potential of the gate electrode of the first transistor in accordance with an external factor. The second transistor has a first terminal that is connected to the gate electrode of the first transistor and a second terminal that is connected to a corresponding one of the second power supply lines. The second transistor has a gate electrode that is connected to a corresponding one of the scanning lines. The first capacitive element holds the electric potential of the gate electrode of the first transistor. Each of the scanning lines is formed in a layer that is different from a layer in which the gate electrode of the first transistor and the gate electrode of the second transistor are formed. Each of the scanning lines is arranged so as to at least partly overlap the gate electrode of the second transistor in plan view.

According to the above configuration, because the first transistor outputs an electric current, of which the magnitude corresponds to an external factor, to the corresponding one of the detection lines, it is possible to detect the external factor by sequentially detecting the electric current in regard to the unit circuits selected by the scanning line. Here, because each of the scanning lines is formed in a layer that is different from a layer in which the gate electrodes are formed and is arranged so as to extend over the gate electrode of the second transistor, it is possible to arrange the unit circuits in high density. In the above description, the phrase "in plan view" means "when viewed in the normal direction of the substrate". In the above configuration, each of the first power supply lines and a corresponding one of the second power supply lines may be electrically connected to each other. That is, each of the first power supply lines and a corresponding one of the second power supply lines may be integrated. If so doing, it is possible to simplify the circuitry of the detection device. In addition, the layer structure of each unit circuit may be simplified, and the unit circuits may be arranged in high density.

SECOND APPLICATION EXAMPLE

In the above detection device, the scanning lines and the gate electrodes of the second transistors may be electrically connected through contact holes that are formed in a normal direction of the substrate on the gate electrodes of the second transistors.

According to the above configuration, because the scanning lines are connected to the gate electrodes of the second transistors in the normal direction of the substrate, it is not necessary to provide additional regions for connecting the scanning lines with the second transistors. Thus, it is possible to arrange the unit circuits in high density.

THIRD APPLICATION EXAMPLE

In the above detection device, a channel region of each first transistor and a channel region of each second transistor may be arranged so as to make a certain angle with respect to a direction in which the scanning lines extend, wherein each of the scanning lines may be arranged so as to cross over the channel region of the first transistor and the channel region of the second transistor in plan view.

According to the above configuration, it is possible to arrange the unit circuits in high density.

FOURTH APPLICATION EXAMPLE

In the above detection device, the detection lines and the second power supply lines may be formed in different layers, wherein each of the detection lines may be arranged so as to extend along a direction in which the second power supply lines extend in plan view and at least partly overlap the second power supply line.

According to the above configuration, because the detection lines and the second power supply lines may be arranged in a small area, it is possible to reduce the pitch at which the unit circuits are arranged in the row direction. Thus, the unit circuits may be arranged in high density. In addition, in the above configuration, each of the first power supply lines and a corresponding one of the second power supply lines may be electrically connected to each other. That is, each of the first power supply lines and a corresponding one of the second power supply lines may be integrated. If so doing, it is possible to simplify the circuitry of the detection device. In addition, the layer structure of each unit circuit may be simplified, and the unit circuits may be arranged in high density.

FIFTH APPLICATION EXAMPLE

In the above detection device, among rows of the unit circuits, two of the first power supply lines that are arranged along the adjacent rows may be formed in different layers from each other.

According to the above configuration, the first power supply lines may be arranged in positions adjacent to each other in plan view. Thus, it is possible to reduce the pitch in the column direction, at which the unit circuits are arranged.

SIXTH APPLICATION EXAMPLE

In the above detection device, a direction of a channel length of each of the first transistors may be oriented along a direction of a channel length of each of the second transistors.

According to the above configuration, because the direction of the channel length of each of the first transistors is oriented along the direction of the channel length of each of the second transistors, it is possible to collectively arrange the channel region of each of the first transistors and the channel region of a corresponding one of the second transistors in a minimum area. Here, the channel length indicates the length of a channel region along a direction from the first terminal of a transistor to the second terminal thereof. In this manner, it is possible to arrange the first transistors and the second transistors in high density. In addition, in the above configuration, each of the first power supply lines and a corresponding one of the second power supply lines may be electrically connected to each other. That is, each of the first power supply lines and a corresponding one of the second power supply lines may be integrated. If so doing, it is possible to simplify the circuitry of the detection device. In addition, the layer structure of each unit circuit may be simplified, and the unit circuits may be arranged in high density.

SEVENTH APPLICATION EXAMPLE

In the above detection device, the first transistors and the second transistors may be arranged so that a direction of the channel length of each of the first transistors and the second transistors intersects with both a direction in which the scanning lines extend and a direction in which the detection lines extend in plan view.

According to the above configuration, because it is possible to reduce the pitch at which the channel regions of the first transistors and the channel regions of the second transistors are arranged, it is possible to reduce the pitch at which the unit circuits are arranged. In this manner, it is possible to improve the resolution of the detection device. In the above description, the phrase "in plan view" means "when viewed in the normal direction of the substrate".

EIGHTH APPLICATION EXAMPLE

In the above detection device, the first terminals of the first transistors and the first terminals of the second transistors may be aligned along a direction in which the scanning lines extend in plan view, wherein the second terminals of the first transistors and the second terminals of the second transistors may be aligned along a direction in which the scanning lines extend in plan view.

According to the above configuration, it is possible to linearly arrange the wirings that extend along the scanning lines. Thus, it is possible to prevent a signal delay due to complex wirings.

NINTH APPLICATION EXAMPLE

In the above detection device, the first transistors and the second transistors may be oriented so that a direction of the channel length of each of the first transistors and the second transistors is perpendicular to a direction in which the scanning lines extend in plan view.

According to the above configuration, the wirings that extend in a direction perpendicular to the scanning lines may be arranged to overlap the first transistors or the second transistors, so that it is possible to arrange these components in high density.

TENTH APPLICATION EXAMPLE

In the above detection device, each of the first capacitive elements may include a first electrode and a second electrode, wherein the channel region of each of the first transistors and the channel region of each of the second transistors may be covered with at least one of the first electrode and the second electrode in plan view.

According to the above configuration, because the channel region of each of the first transistors and the channel region of each of the second transistors are covered with at least one of the first electrode and the second electrode in plan view, it is possible to shield the channel regions against light by one or two light shielding layers. Thus, it is possible to reduce an off electric current that flows through the first transistors or the second transistors. In the above configuration, each of the first power supply lines and a corresponding one of the second power supply lines may be electrically connected to each other. That is, each of the first power supply lines and a corresponding one of the second power supply lines may be integrated. If so doing, it is possible to simplify the circuitry of the detection device. In addition, the layer structure of each unit circuit may be simplified, and the unit circuits may be arranged in high density.

ELEVENTH APPLICATION EXAMPLE

In the above detection device, each of the first electrodes may also serve as an electrode of the detection element.

According to the above configuration, it is possible to increase an area occupied by the first capacitive element and an area occupied by the detection element.

TWELFTH APPLICATION EXAMPLE

A detection device includes a substrate, and includes a plurality of scanning lines, a plurality of detection lines, a plurality of first power supply lines, a plurality of second power supply lines and a plurality of unit circuits, which are arranged on the substrate. The plurality of unit circuits are provided at positions corresponding to intersections of the scanning lines and the detection lines. Each of the unit circuits includes a first transistor, a detection element, a second transistor, and a first capacitive element. The first transistor has a first terminal that is connected to a corresponding one of the detection lines and a second terminal that is connected to a corresponding one of the first power supply lines. The first transistor supplies the corresponding one of the detection lines with a detection signal corresponding to the electric potential of a gate electrode thereof. The detection element is connected to the gate electrode of the first transistor and varies the electric potential of the gate electrode of the first transistor in accordance with an external factor. The second transistor has a first terminal that is connected to the gate electrode of the first transistor and a second terminal that is connected to a corresponding one of the second power supply lines. The second transistor has a gate electrode that is connected to a corresponding one of the scanning lines. The first capacitive element holds the electric potential of the gate electrode of the first transistor. Among rows of the unit circuits, each of the first power supply lines is formed at a position that is placed between the two adjacent rows, and only one of the first power supply lines is formed for each two adjacent rows. Each of the first power supply lines supplies power to the unit circuits of the corresponding two adjacent rows.

According to the above configuration, because the first transistor outputs an electric current, of which the magnitude corresponds to an external factor, to the corresponding one of the detection lines, it is possible to detect the external factor by sequentially detecting the electric current in regard to the unit circuits selected by the scanning line. Here, because each first power supply line is shared by the unit circuits of the corresponding two adjacent rows, it is possible to reduce the number of first power supply lines and, thereby, it is possible to improve the density in which the unit circuits are arranged.

THIRTEENTH APPLICATION EXAMPLE

In the above detection device, components of the two adjacent unit circuits that are placed on both sides of the corresponding one of the first power supply lines may be formed symmetrically with respect to a direction in which the first power supply lines extend.

According to the above configuration, it is possible to reduce variation in the characteristics of the unit circuits.

FOURTEENTH APPLICATION EXAMPLE

In the above detection device, channel regions of a pair of the first transistors in the two adjacent unit circuits that are placed on both sides of the corresponding one of the first power supply lines may be continuously formed of a silicon film.

According to the above configuration, because it is possible to reduce the number of contacts between both the first transistors and wirings, it is possible to improve the yields in a manufacturing process.

FIFTEENTH APPLICATION EXAMPLE

In the above detection device, a channel region of the second transistor may be formed of a silicon film that is formed continuously across a boundary between the adjacent two unit circuits, wherein a pair of the second transistors that are formed in the adjacent two unit circuits may have the common second terminal through which the pair of second transistors are electrically connected to the corresponding one of the second power supply lines.

According to the above configuration, because it is possible to reduce the number of contacts between both the first transistors and wirings, it is possible to improve the yields in a manufacturing process. In addition, in the above configuration, each of the first power supply lines and a corresponding one of the second power supply lines may be electrically connected to each other. That is, each of the first power supply lines and a corresponding one of the second power supply lines may be integrated. If so doing, it is possible to simplify the circuitry of the detection device. In addition, the layer structure of each unit circuit may be simplified, and the unit circuits may be arranged in high density.

SIXTEENTH APPLICATION EXAMPLE

A detection device includes a substrate, and includes a plurality of scanning lines, a plurality of detection lines, a plurality of power supply lines and a plurality of unit circuits, which are arranged on the substrate. The plurality of unit circuits are provided at positions corresponding to intersections of the scanning lines and the detection lines. Each of the unit circuits includes a first transistor, a detection element, a second transistor, and a first capacitive element. The first transistor has a first terminal that is connected to a corresponding one of the detection lines and a second terminal that is connected to a corresponding one of the power supply lines. The first transistor supplies the corresponding one of the detection lines with a detection signal corresponding to the electric potential of a gate electrode thereof. The detection element is connected to the gate electrode of the first transistor and varies the electric potential of the gate electrode of the first transistor in accordance with an external factor. The second transistor has a first terminal that is connected to the gate electrode of the first transistor and a second terminal that is connected to a corresponding one of the power supply lines. The second transistor has a gate electrode that is connected to a corresponding one of the scanning lines. The first capacitive element holds the electric potential of the gate electrode of the first transistor. Each of the scanning lines is formed in a layer that is different from a layer in which the gate electrode of the first transistor and the gate electrode of the second transistor are formed. Each of the scanning lines is arranged so as to at least partly overlap the gate electrode of the second transistor in plan view.

According to the above configuration, because the first transistor outputs an electric current, of which the magnitude corresponds to an external factor, to the corresponding one of the detection lines, it is possible to detect the external factor by sequentially detecting the electric current in regard to the unit circuits selected by the scanning line. Here, because each of the scanning lines is formed in a layer that is different from a layer in which the gate electrodes are formed and is arranged so as to extend over the gate electrode of the second transistor, it is possible to arrange the unit circuits in high density. In addition, because each unit circuit may be formed to include only the single power supply line, it is possible to simplify the circuitry of the detection device in comparison with the configuration that each unit circuit includes a plurality of power supply lines. In addition, because it is not necessary to form a plurality of power supply lines in each unit circuit in different layers, it is possible to simplify the layer structure of each unit circuit. Furthermore, it is possible to reduce an area in which the power supply lines are arranged and, thereby, it is possible to form the unit circuits in high density.

SEVENTEENTH APPLICATION EXAMPLE

In the above detection device, the detection lines and the power supply lines may be formed in different layers, wherein each of the detection lines may be arranged so as to extend along a direction in which the power supply lines extend in plan view and at least partly overlap the power supply line.

According to the above configuration, because the detection lines and the power supply lines may be arranged in a small area, it is possible to reduce the pitch at which the unit circuits are arranged in the row direction. Thus, the unit circuits may be arranged in high density. In addition, because each unit circuit may be formed to include only the single power supply line, it is possible to simplify the circuitry of the detection device in comparison with the configuration that each unit circuit includes a plurality of power supply lines. In addition, because it is not necessary to form a plurality of power supply lines in each unit circuit in different layers, it is possible to simplify the layer structure of each unit circuit. Furthermore, it is possible to reduce an area in which the power supply lines are arranged and, thereby, it is possible to form the unit circuits in high density.

EIGHTEENTH APPLICATION EXAMPLE

In the above detection device, a direction of a channel length of each of the first transistors may be oriented along a direction of a channel length of each of the second transistors.

According to the above configuration, because the direction of the channel length of each of the first transistors is oriented along the direction of the channel length of each of the second transistors, it is possible to collectively arrange channel region of each of the first transistors and the channel region of a corresponding one of the second transistors in a minimum area. In this manner, it is possible to arrange the first transistors and the second transistors in high density. In addition, because each unit circuit may be formed to include only the single power supply line, it is possible to simplify the circuitry of the detection device in comparison with the configuration that each unit circuit includes a plurality of power supply lines. In addition, because it is not necessary to form a plurality of power supply lines in each unit circuit in different layers, it is possible to simplify the layer structure of each unit circuit. Furthermore, it is possible to reduce an area in which the power supply lines are arranged and, thereby, it is possible to form the unit circuits in high density.

NINETEENTH APPLICATION EXAMPLE

In the above detection device, each of the first capacitive elements may include a first electrode and a second electrode, wherein the channel region of each of the first transistors and the channel region of each of the second transistors may be covered with at least one of the first electrode and the second electrode in plan view.

According to the above configuration, because the channel region of each of the first transistors and the channel region of each of the second transistors are covered with at least one of the first electrode and the second electrode in plan view, it is possible to shield the channel regions against light by one or two light shielding layers. Thus, it is possible to reduce an off electric current that flows through the first transistors or the second transistors. In addition, because each unit circuit may be formed to include only the single power supply line, it is possible to simplify the circuitry of the detection device in comparison with the configuration that each unit circuit includes a plurality of power supply lines. In addition, because it is not necessary to form a plurality of power supply lines in each unit circuit in different layers, it is possible to simplify the layer structure of each unit circuit. Furthermore, it is possible to reduce an area in which the power supply lines are arranged and, thereby, it is possible to form the unit circuits in high density.

TWENTIETH APPLICATION EXAMPLE

An electronic apparatus is provided with the detection device.

According to the above configuration, it is possible to implement an electronic apparatus that is provided with an input interface having a high detection sensitivity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
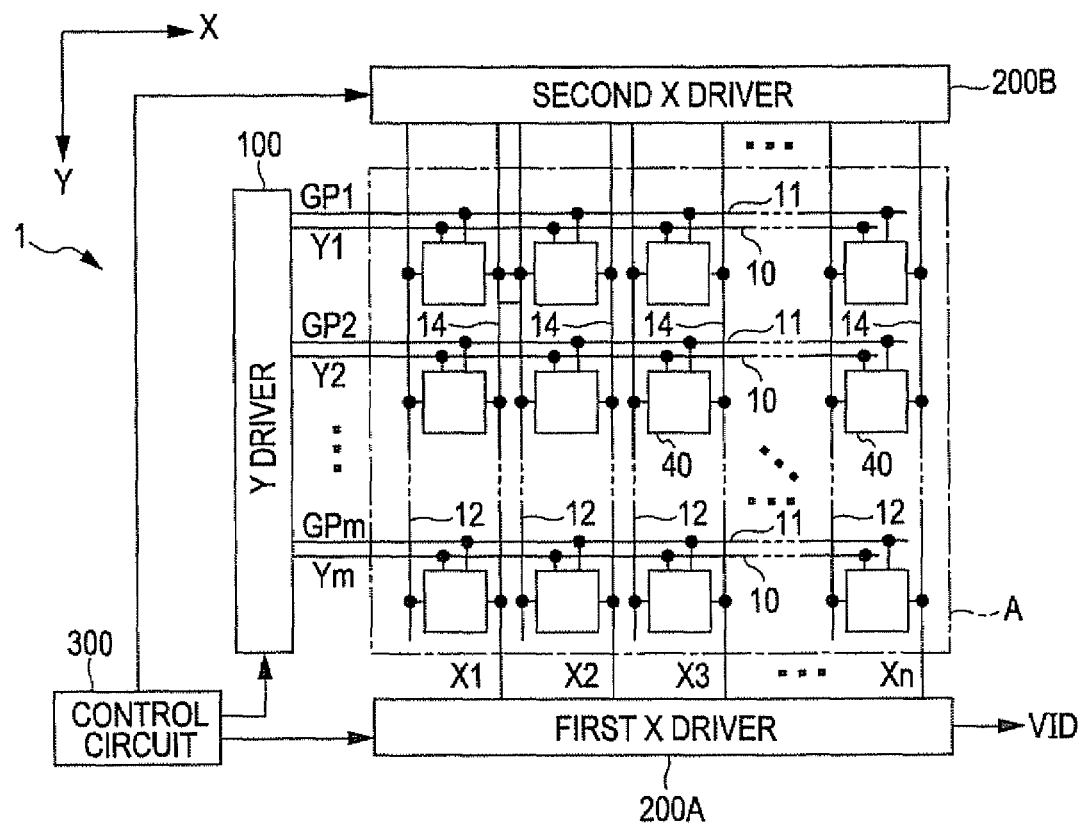
FIG. 1 is a block diagram that shows the configuration of a detection device.

Hereinafter, embodiments of a detection device and an electronic apparatus will be described with reference to the accompanying drawings. Note that, in the accompanying drawings, to make it easier to recognize the components in the drawings, the dimensions and ratio of the components are appropriately varied from those of the actual components.

First Embodiment

A. Configuration and Operation of Circuit

FIG. 1 is a view that shows the configuration of a detection device according to a first embodiment. As shown in the drawing, the detection device 1 includes a pixel area A, a Y driver 100, a first X driver 200A, a second X driver 200B, and a control circuit 300. In the pixel area A, m scanning lines 10 that extend in an X direction, m first power supply lines 11 that extend in the X direction in pairs with the scanning lines 10, n second power supply lines 12 that extend in a Y direction perpendicular to the X direction, n detection lines 14 that extend in the Y direction in pairs with the second power supply lines 12 are formed. Pixel circuits 40 (unit circuits) are arranged at positions corresponding to intersections of the scanning lines 10 and the second power supply lines 12. Thus, these pixel circuits 40 are arranged in a matrix of m rows by n columns.

The Y driver 100 selects the pixel circuits 40, arranged in the pixel area A, in units of rows for every horizontal scanning period and outputs a corresponding one of scanning signals Y1 to Ym to each scanning line 10. The first X driver 200A samples and holds detection signals X1 to Xn supplied from the n detection lines 14 and generates an integrated detection signal VID on the basis of the result of sample and hold. In addition, the second X driver 200B supplies the second power supply lines 12 with a power supply voltage RSL. The power supply voltage RSL is one of a first power supply electric potential VDD or a second power supply electric potential VSS. Furthermore, the first X driver 200A precharges each of the detection lines 14 at the second power supply electric potential VSS at a predetermined timing. As will be described later, when the electric potential of each first power supply line 11 is the first power supply electric potential VDD, detection signals X1 to Xn, of which the magnitude corresponds to the amount of incident light, are output from the pixel circuits 40. Note that signals output from the m pixel circuits 40 that are arranged in the column direction are time-sharing multiplexed in each of the detection signals X1 to Xn. The control circuit 300 supplies various control signals, such as a clock signal, to the Y driver 100, the first X driver 200A and the second X driver 200B.

Figure 2:
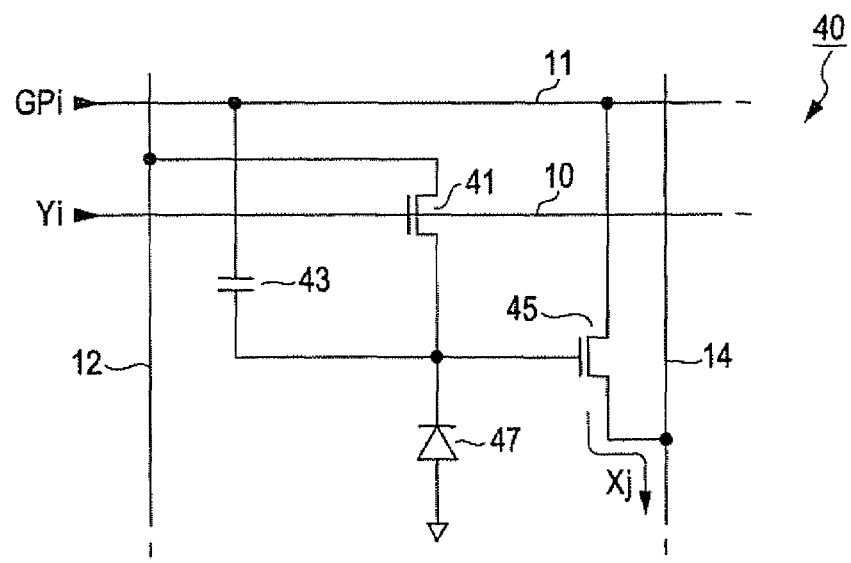
FIG. 2 is a circuit diagram that shows the configuration of a pixel circuit.

FIG. 2 is a view that shows the configuration of the pixel circuit 40. This pixel circuit 40 is arranged in the i-th row (i is an integer of $1 \leq i \leq m$) and the j-th column (j is an integer of $1 \leq j \leq n$). The other pixel circuits 40 also have the same configuration. Each pixel circuit 40 includes a photodiode 47 as a detection element. The photodiode 47 outputs an electric current of which the magnitude corresponds to the amount of incident light. The photodiode 47 is a photoelectric conversion element that converts light energy into electric energy. The anode of the photodiode 47 is connected to a fixed electric potential, and the cathode of the photodiode 47 is connected to the gate of an amplifier transistor 45, which serves as a first transistor. In addition, a first capacitive element 43 is provided between the gate of the amplifier transistor 45 and the first power supply line 11 and holds a gate electric potential of the amplifier transistor 45. Electric charge output from the photodiode 47 is stored in the first capacitive element 43. A reset transistor 41, which serves as a second transistor, is provided between the gate of the amplifier transistor 45 and the second power supply line 12. This reset transistor 41 functions as a switching element. The reset transistor 41 enters an on state when the scanning signal Yi attains a selection electric potential or enters an off state when the scanning signal Yi attains a non-selection electric potential. When the reset transistor 41 is in an on state, the electric potential of the second power supply line 12 is supplied to the gate of the amplifier transistor 45. At the same time, the drain of the amplifier transistor 45 is electrically connected to the first power supply line 11, and the source of the amplifier transistor 45 is electrically connected to the detection line 14. Note that the drain and source of the amplifier transistor 45 have such a relationship that the electrode having a higher electric potential is defined as a drain and the electrode having a lower electric potential is defined as a source, so that the drain and the source may be interchanged depending on a bias.

Figure 3:
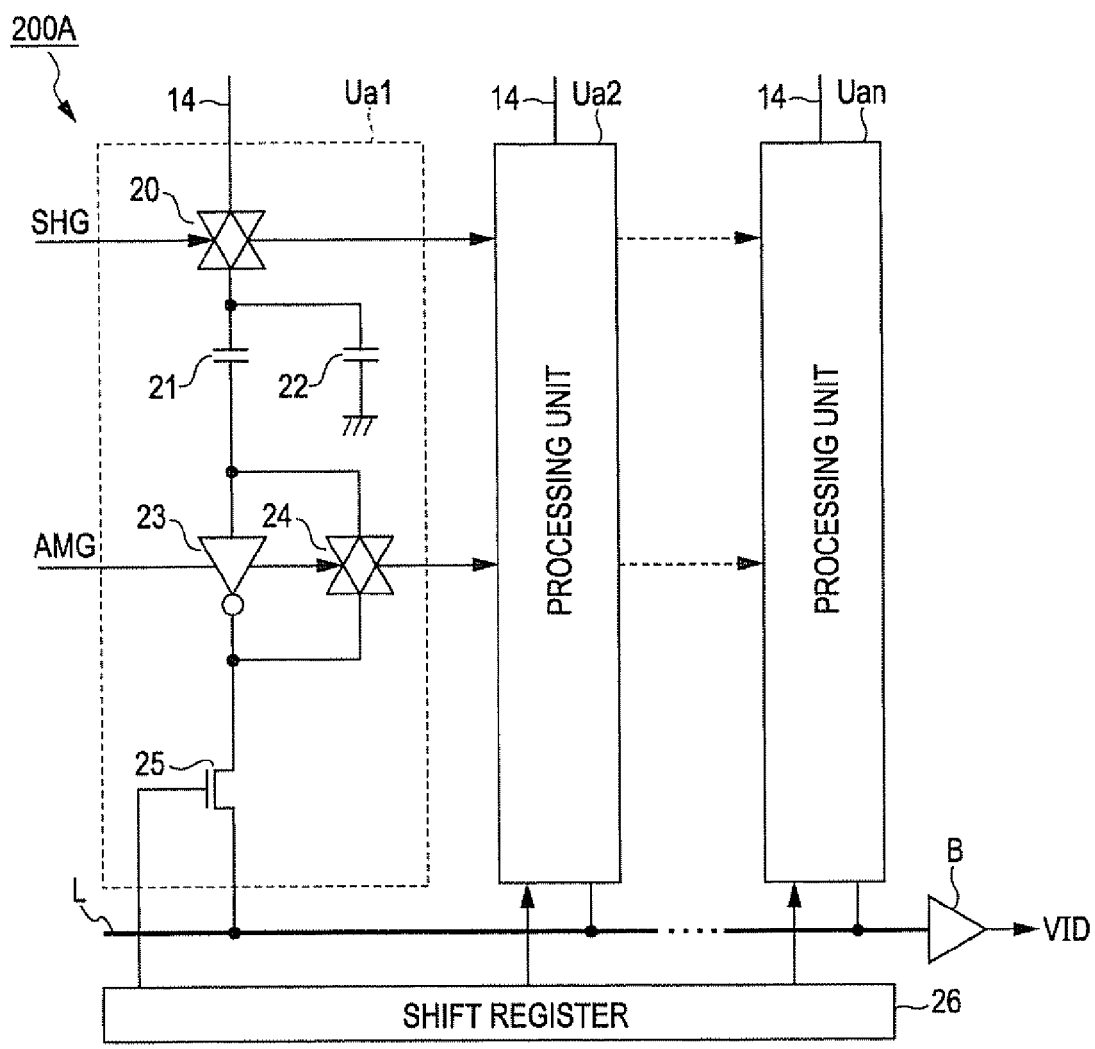
FIG. 3 is a block diagram that shows the configuration of a first X driver.

FIG. 3 is a block diagram of the first X driver 200A. The first X driver 200A includes processing units Ua1 to Uan corresponding to the n detection lines 14, respectively. Here, the processing unit Ua1 will be described; however, other processing units also have the same configuration. A transfer gate 20, a capacitive element 21 and a capacitive element 22 function as a sample and hold circuit. The transfer gate 20 enters an on state when a sampling signal SHG is at a high level, while the transfer gate 20 enters an off state when the sampling signal SHG is at a low level. In this manner, a detection signal X1 is taken in and held. In addition, an inverter 23 functions as an amplifier circuit. The transfer gate 24 is used to bias the input of the inverter 23 to an intermediate electric potential. That is, as a control signal AMG attains a high level, the input and output of the inverter 23 are short-circuited, and the input electric potential is biased to an intermediate electric potential. The output terminal of the inverter 23 is connected through a switching transistor 25 to a wiring L. The gate of the switching transistor 25 is supplied with an output signal of a shift register 26. The shift register 26 sequentially transfers a transfer start pulse DX in accordance with an X clock signal XCK and then generates an output signal. Owing to this output signal, each of the processing units Ua1 to Uan exclusively supplies a detection signal to the line L, the detection signal is composed in the line L and is output through a buffer B as the integrated detection signal VID. Note that the sampling signal SHG, the control signal AMG, the transfer start pulse DX and the X clock signal XCK are supplied from the control circuit 300.

Figure 4:
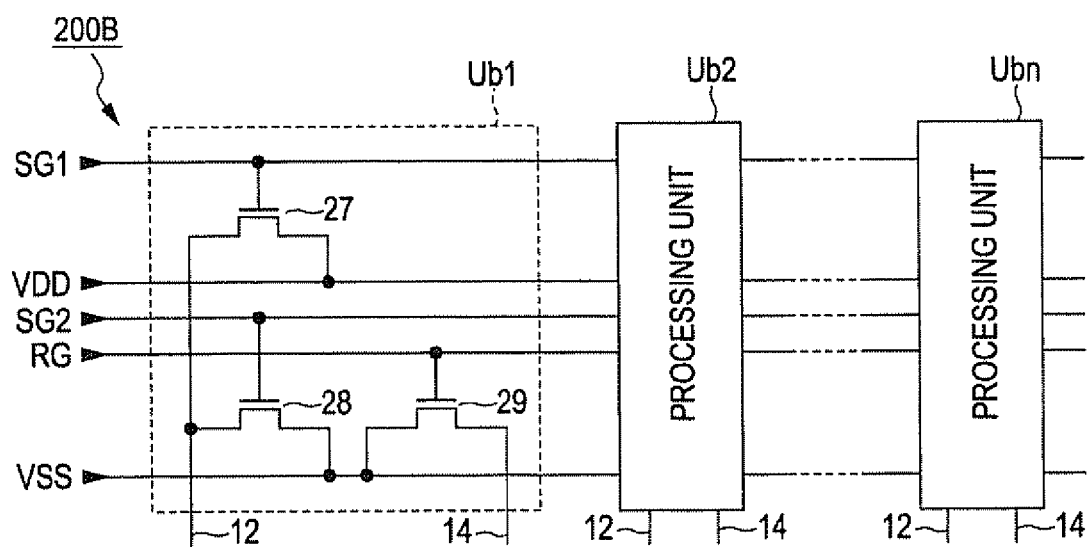
FIG. 4 is a block diagram that shows the configuration of a second X driver.

FIG. 4 is a block diagram that shows the configuration of the second X driver 200B. The second X driver 200B includes processing units Ub1 to Ubn corresponding to the n columns, respectively. Here, the processing unit Ub1 will be described; however, other processing units also have the same configuration. The on/off of a transistor 27 is controlled by a control signal SG1, and the on/off of a transistor 28 is controlled by a control signal SG2. Here, the control signal SG2 is obtained by inverting the control signal SG1. Thus, the transistor 27 or the transistor 28 exclusively enters an on state to thereby supply the second power supply line 12 with the first power supply electric potential VDD or the second power supply electric potential VSS, respectively. In addition, a transistor 29, when a control signal RG attains a high level, enters an on state to thereby supply the detection line 14 with the second power supply electric potential VSS. In this manner, it is possible to precharge the detection line 14.

Figure 5:
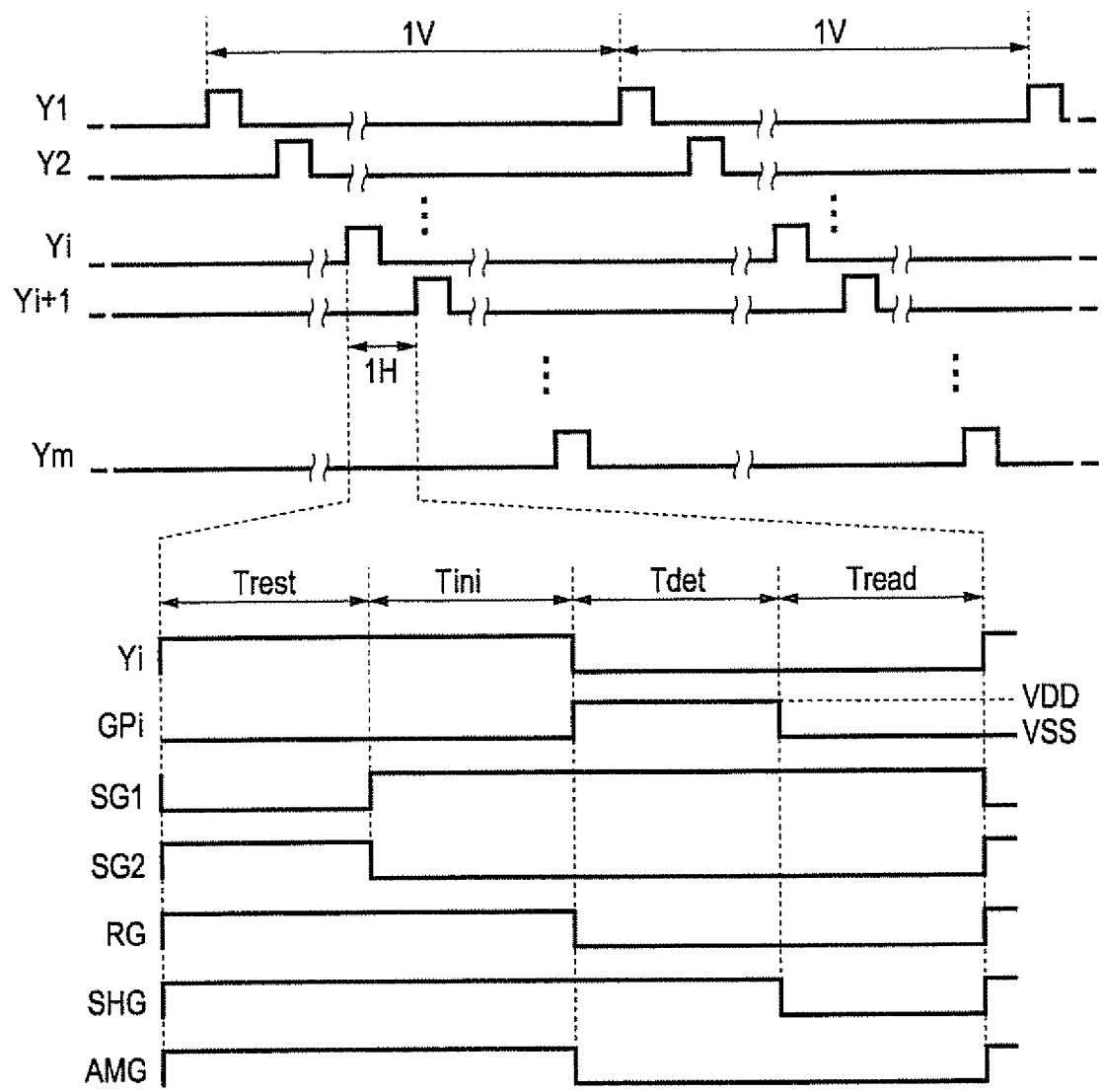
FIG. 5 is a timing chart that shows the signal waveforms of portions of the detection device.

Next, the operation of the detection device 1 will be described. FIG. 5 is a timing chart that shows the signal waveforms of portions of the detection device 1. The scanning signals Y1 to Ym sequentially attain a high level during a partial period of each horizontal scanning period. As shown in the drawing, the i-th horizontal scanning period includes a reset period Trest, an initialization period Tini, a detection period Tdet, and a reading period Tread.

Figure 6:
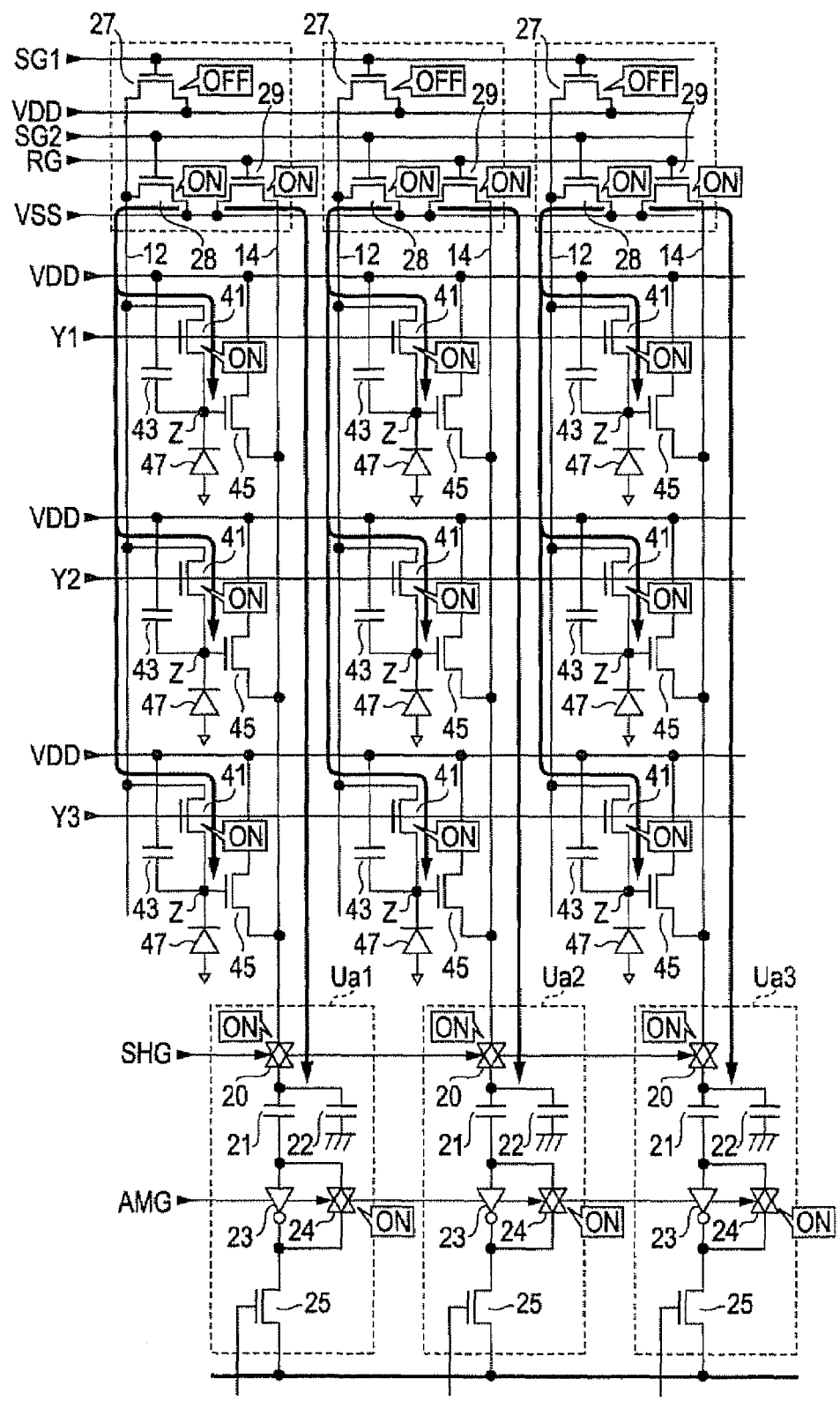
FIG. 6 is a view that illustrates the flow of signals during a reset period.

At first, in the reset period Trest, the gate electric potential of the amplifier transistor 45 is set to the second power supply electric potential VSS. As shown in FIG. 5, in the reset period Trest, because the scanning signal Yi is at a high level, the reset transistor 41 is in an on state. At this time, the control signal SG1 is at a low level, while the control signal SG2 is at a high level. Thus, the transistor 28 enters an on state and, hence, the second power supply electric potential VSS is supplied through the second power supply line 12 to the gate of the amplifier transistor 45. Moreover, because the control signal RG attains a high level, the transistor 29 enters an on state and thereby the detection line 14 is precharged with the second power supply electric potential VSS. When both m and n are equal to 3, as shown in FIG. 6, in each of the pixel circuits 40, the gate electric potential of the amplifier transistor 45 is set to the second power supply electric potential VSS.

Figure 7:
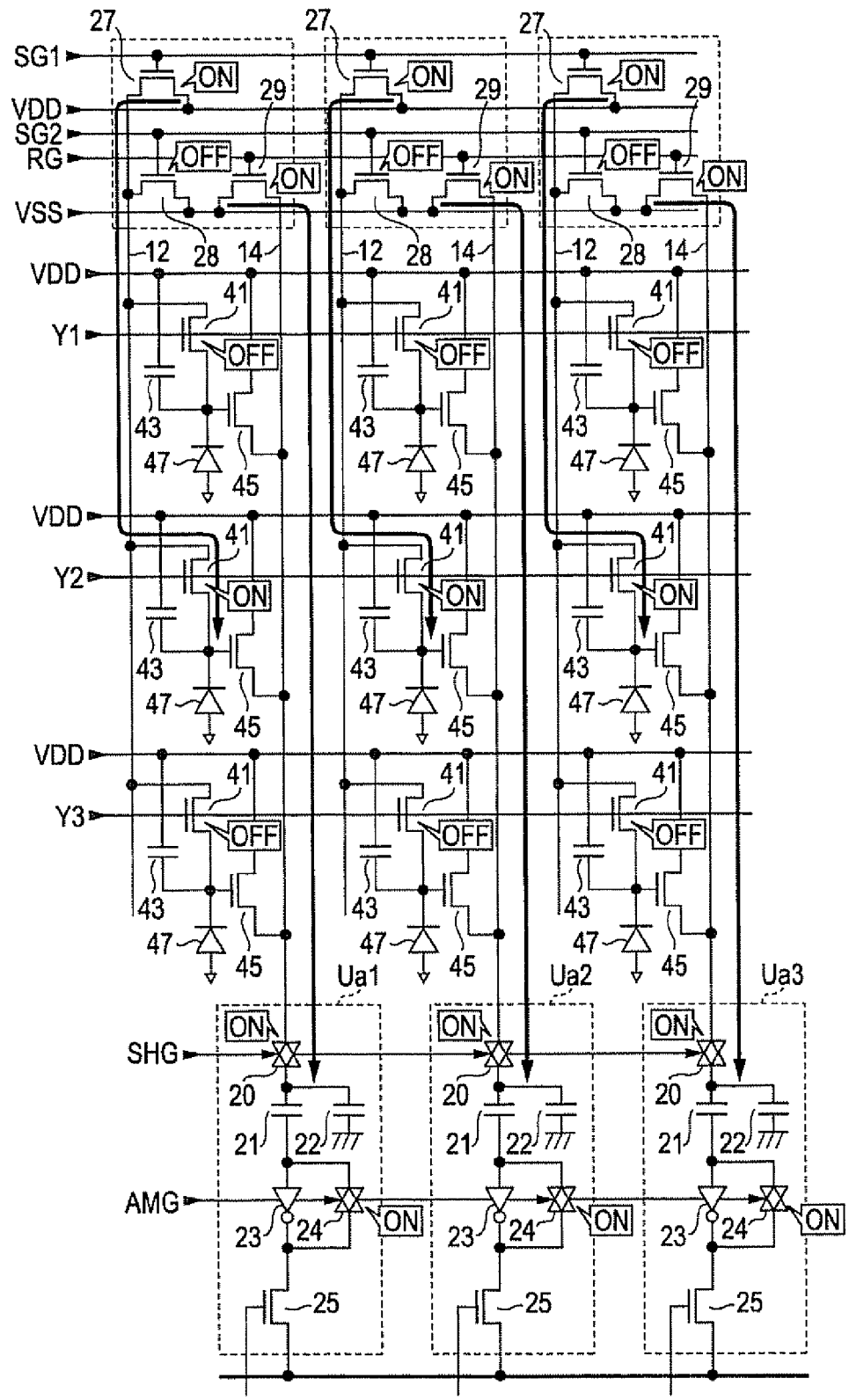
FIG. 7 is a view that illustrates the flow of signals during an initialization period.

Next, in the initialization period Tini, the control signal SG1 is at a high level and thereby the transistor 27 is in an on state. Thus, the first power supply electric potential VDD is supplied through the second power supply line 12 and the reset transistor 41 to the gate of the amplifier transistor 45. As shown in FIG. 7, in the initialization period Tini, the first power supply electric potential VDD is only supplied to the row in which any one of the scanning signals Y1 to Ym is at a high level. In the example shown in FIG. 7, the second row corresponds to the row to which the first power supply electric potential VDD is supplied. In each of the pixel circuits 40 of the other rows, the second power supply electric potential VSS, which has been written in the reset period Trest, is held by the first capacitive element 43. In addition, in the initialization period Tini, because the sampling signal SHG and the control signal AMG each are at a high level, the transfer gates 20 and 24 each enter an on state. At this time, because each of the detection lines 14 is supplied with the second power supply electric potential VSS, the electric potential of one of the terminals of the capacitive element 21 becomes the second power supply electric potential VSS and the electric potential of the other terminal is set to an intermediate electric potential. In this manner, the electric potential of the capacitive element 21 is initialized.

Figure 8:
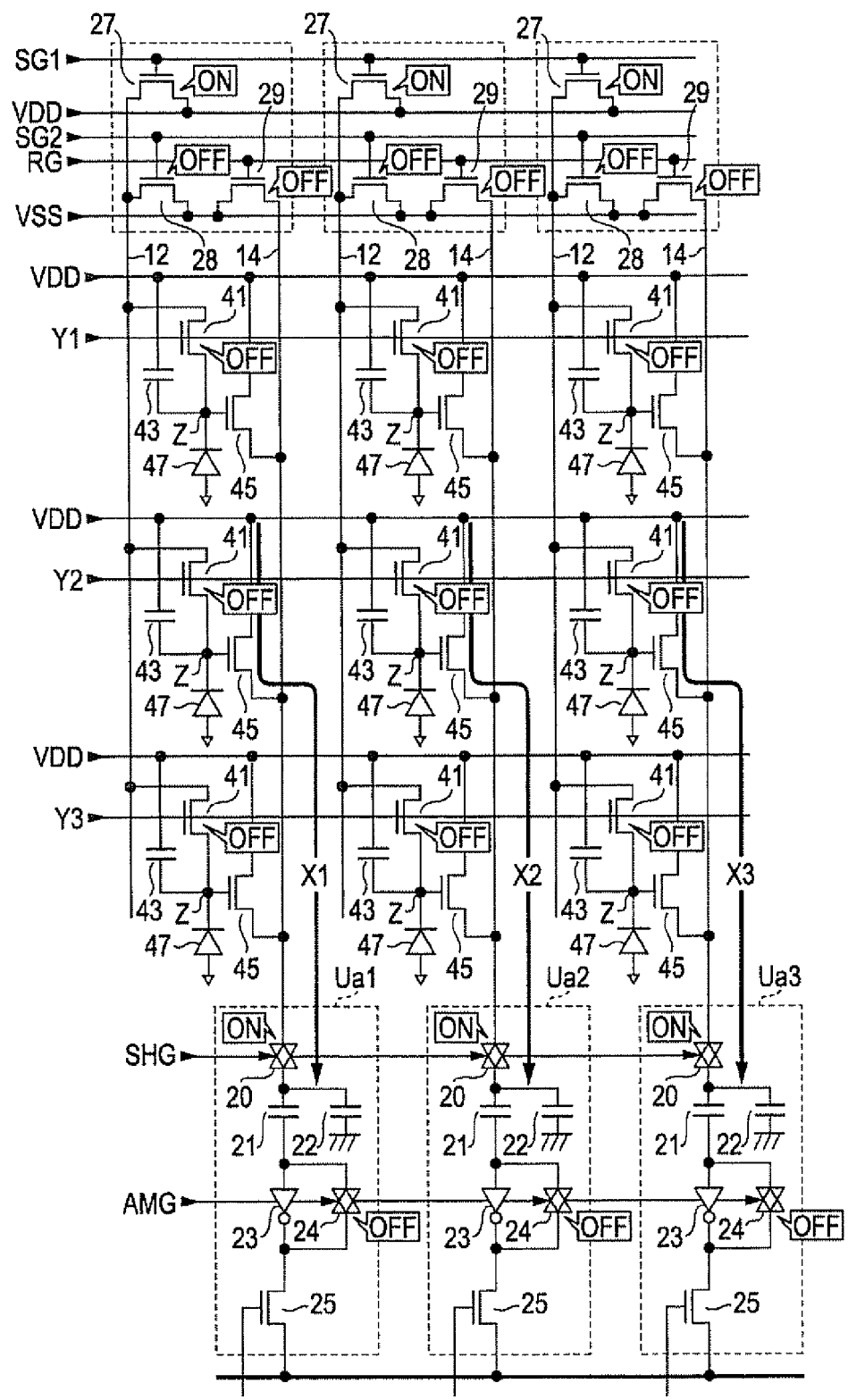
FIG. 8 is a view that illustrates the flow of signals during a detection period.

Next, in the detection period Tdet, as shown in FIG. 5, the electric potential of a power supply signal GPi becomes the first power supply electric potential VDD. In addition, because the control signal RG is at a low level, the transistor 29 is in an off state and thereby the detection line 14 is not supplied with the second power supply electric potential VSS. As shown in FIG. 8, in the detection period Tdet, detection signals X1 to X3 are output from the pixel circuits 40 in the selected row (in this example, the second row).

Figure 9:
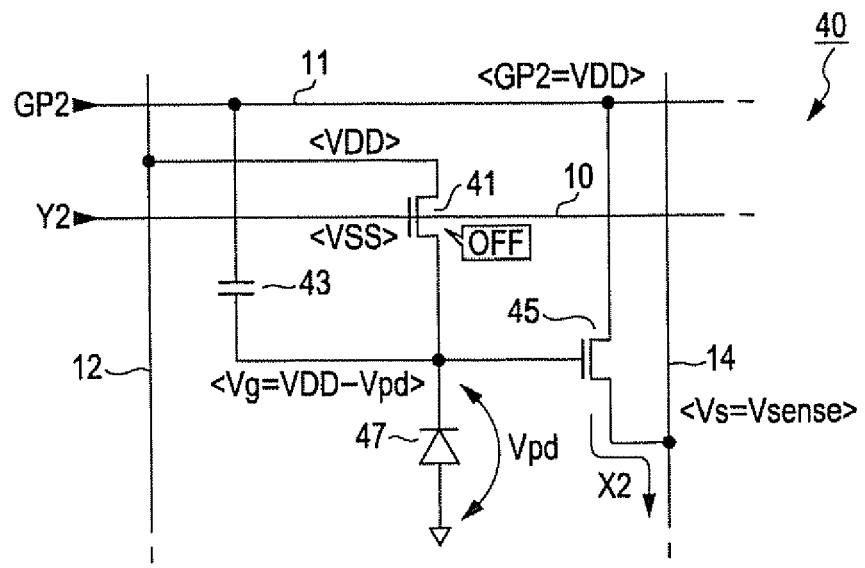
FIG. 9 is a view that illustrates a bias applied to the pixel circuit.
Figure 10:
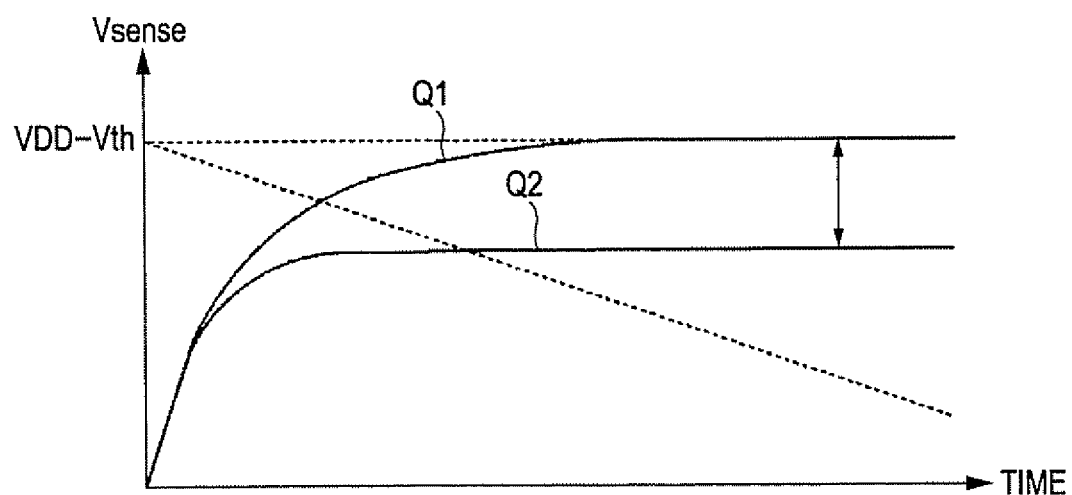
FIG. 10 is a graph that shows a variation in electric potential of a detection line over time.

FIG. 9 is a view that shows a bias applied to the selected second row and second column pixel circuit 40. As shown in the drawing, the gate electric potential Vg of the amplifier transistor 45 is equal to VDD−Vpd where the voltage of the photodiode 47 is Vpd. The voltage Vpd varies in accordance with the amount of incident light that enters the photodiode 47. That is, the photodiode 47 changes the gate electric potential of the amplifier transistor 45 on the basis of the amount of incident light, which is an external factor. Then, an electric current determined on the basis of the gate electric potential is output to the detection line 14 as a detection signal X2. In other words, the amplifier transistor 45 supplies the detection line 14 with the detection signal X2 corresponding to the electric potential of the gate electrode thereof.

Where the electric potential of the detection line 14 is Vsense, the electric potential Vsense varies as shown in FIG. 10. Here, a characteristic Q1 represents the case when the amount of incident light is small and therefore it is dark, and a characteristic Q2 represents the case when the amount of incident light is large and therefore it is bright. That is, in the dark case, the voltage Vpd of the photodiode 47 is small, so that the gate electric potential Vg is high. Thus, a large electric current flows out from the source of the amplifier transistor 45 and, hence, the electric potential Vsense of the detection line 14 rapidly increases. On the other hand, in the bright case, the voltage Vpd of the photodiode 47 is large and, hence, the gate electric potential Vg is low. Thus, because an electric current that flows out from the source of the amplifier transistor 45 is small, the electric potential Vsense of the detection line 14 slowly increases. Then, as the electric potential Vsense is equal to Vg−Vth, the amplifier transistor 45 enters an off state. In this manner, the amount of charge flowing out to the detection line 14 on the basis of the amount of incident light is different, this amount of charge flowing out will be detected as a voltage in the above described processing unit Ua2.

B. Detailed Configuration of Pixel Circuit

Figure 11:
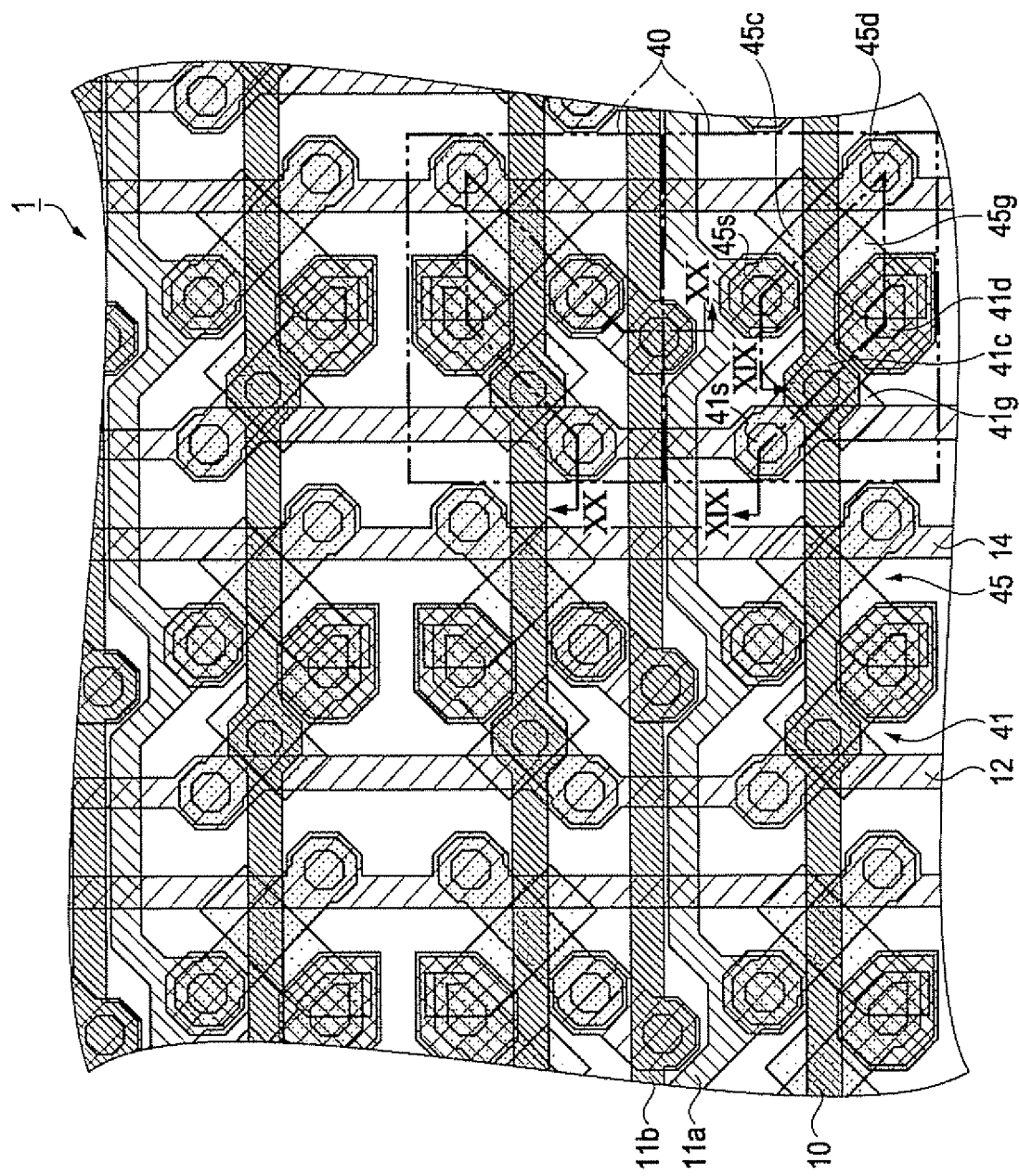
FIG. 11 is a plan view of the detection device in a region that includes a plurality of pixel circuits.
Figure 12:
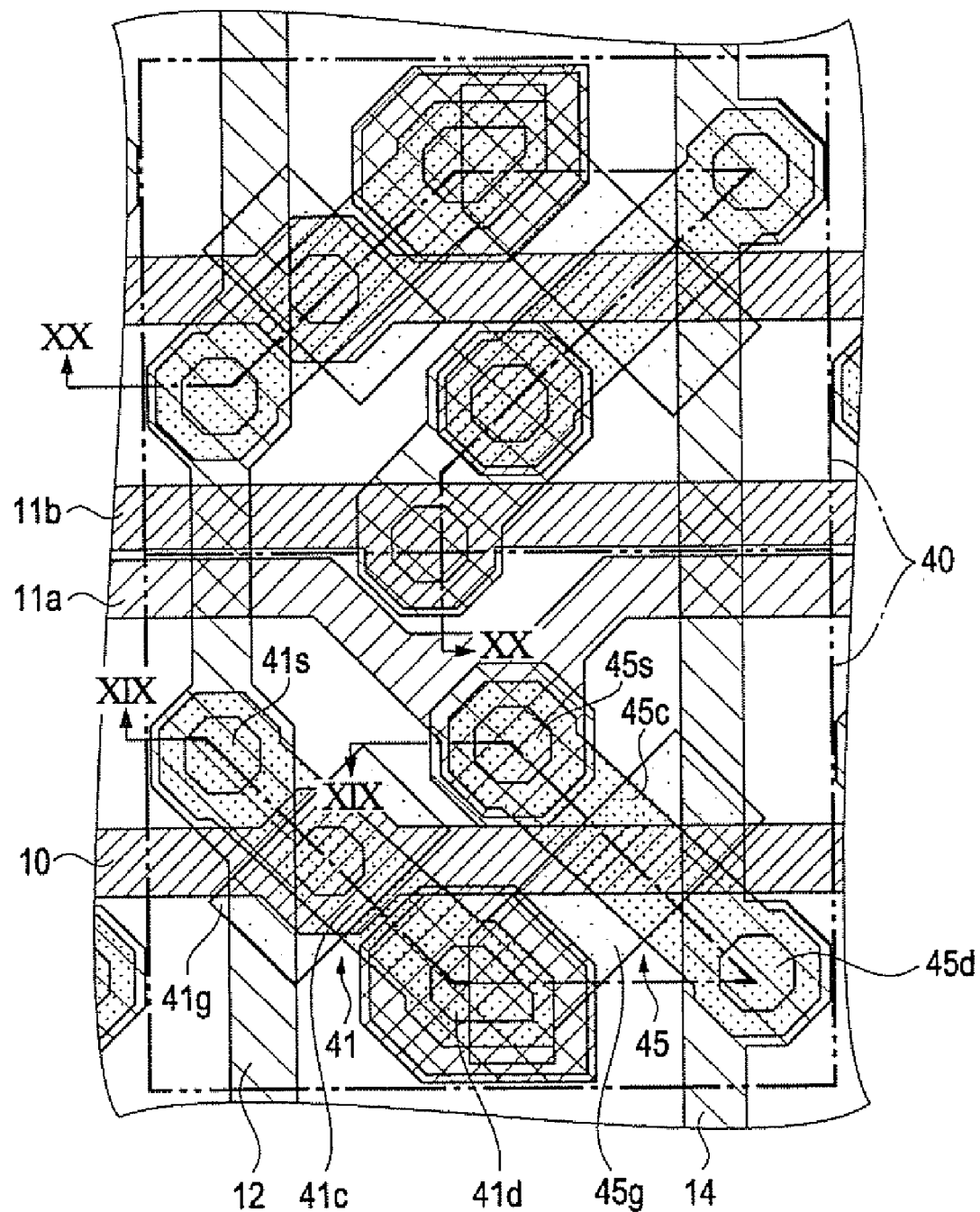
FIG. 12 is an enlarged plan view of the pixel circuits.
Figure 13:
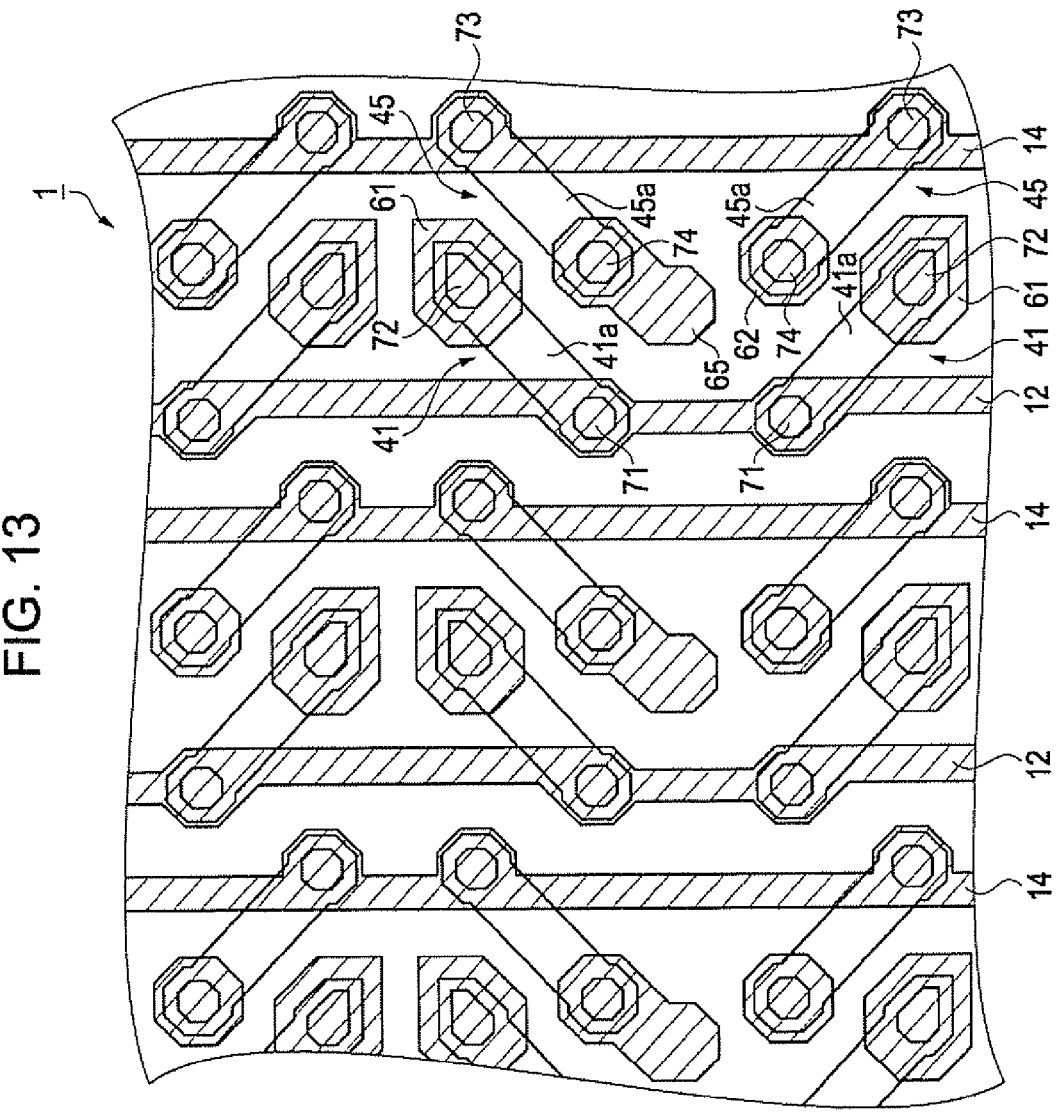
FIG. 13 is a plan view that shows the arrangement of a first layer and a third layer among the components shown in FIG. 11.
Figure 14:
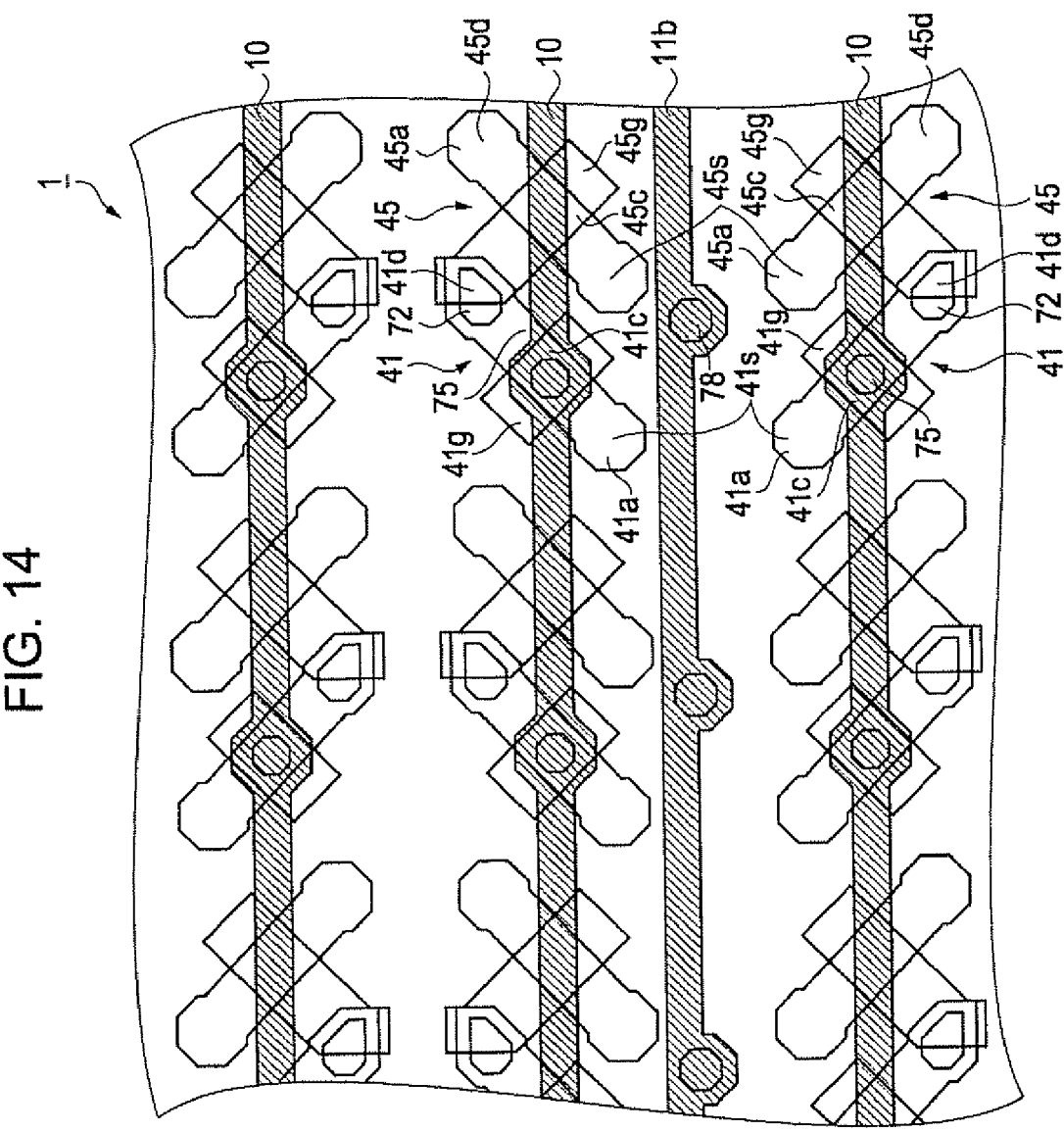
FIG. 14 is a plan view that shows the arrangement of the first layer, a second layer and a fourth layer among the components shown in FIG. 11.
Figure 15:
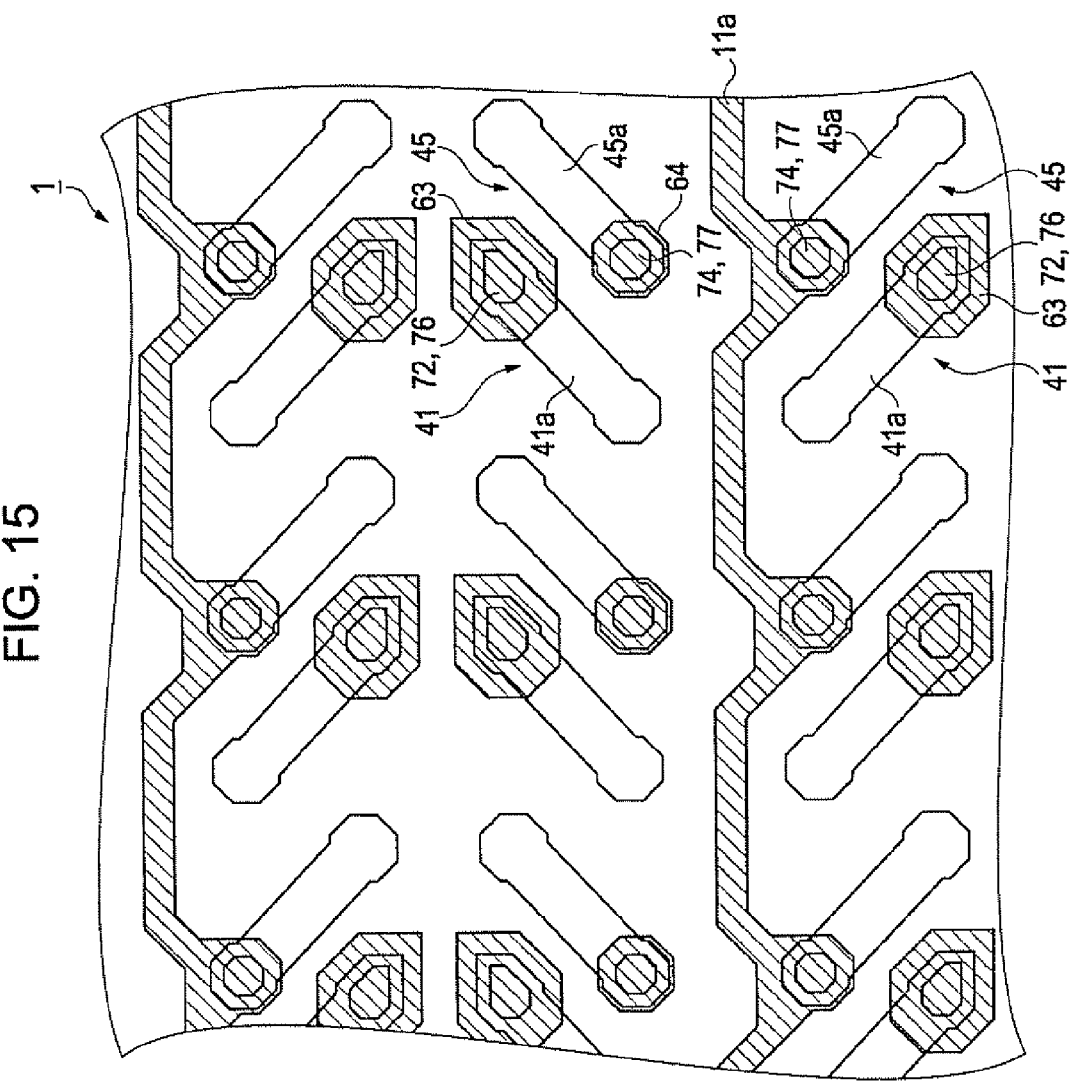
FIG. 15 is a plan view that shows the arrangement of the first layer and a fifth layer among the components shown in FIG. 11.
Figure 19:
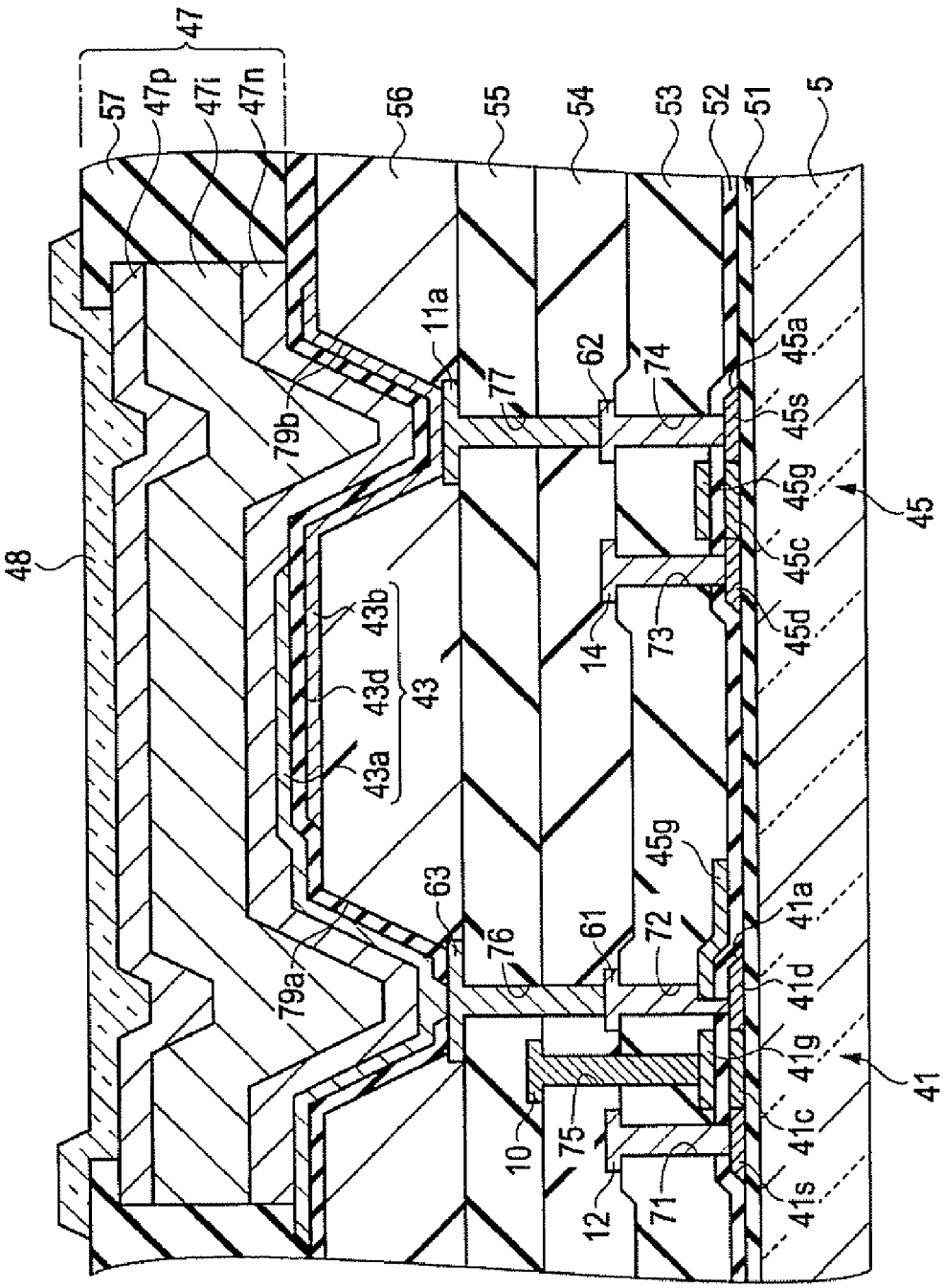
FIG. 19 is a cross-sectional view of the detection device, taken along the line XIX-XIX in FIG. 11.
Figure 20:
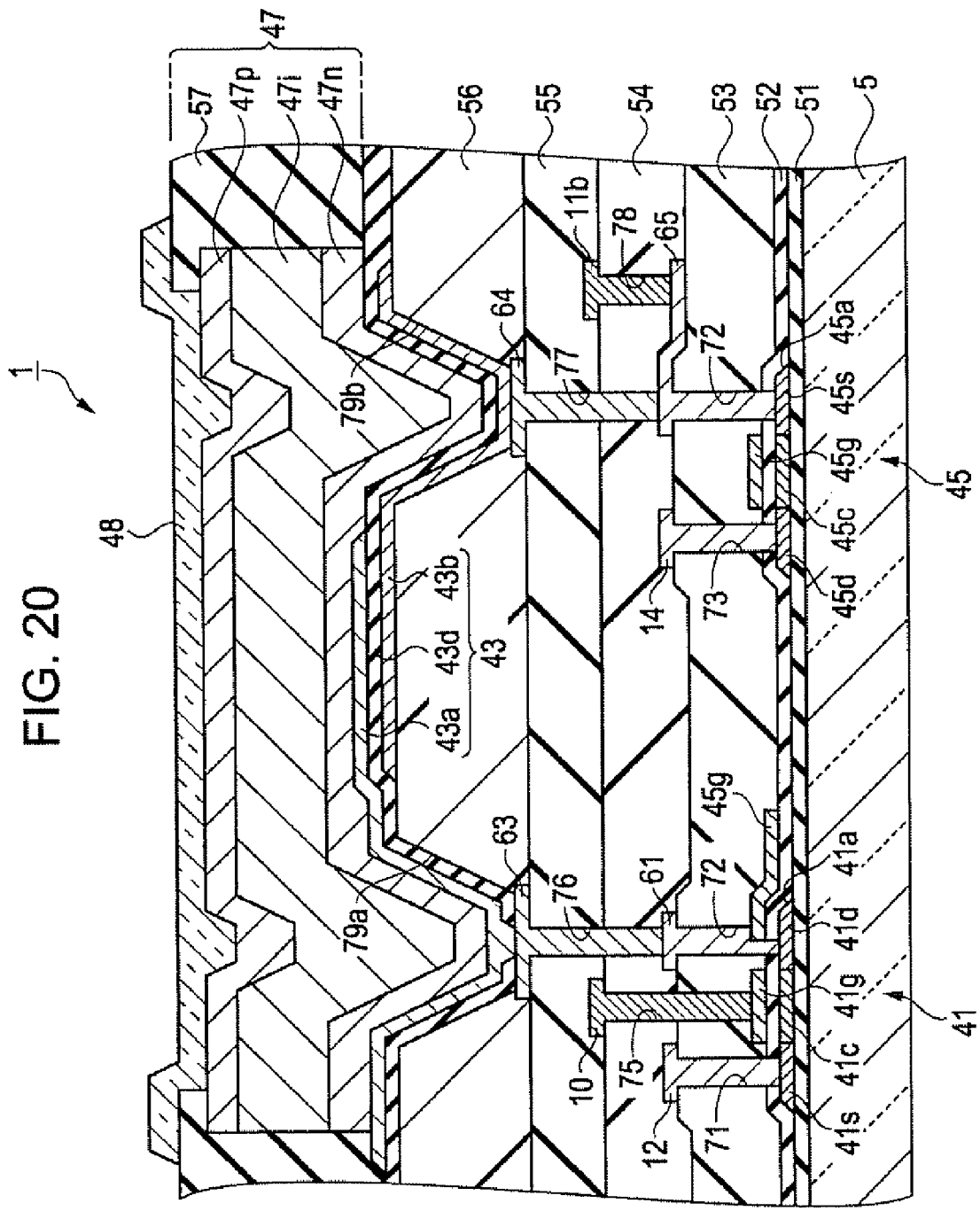
FIG. 20 is a cross-sectional view of the detection device, taken along the line XX-XX in FIG. 11.

Next, the detailed configuration of each pixel circuit 40 will be described. FIG. 11 is a plan view of the detection device 1 in a region that includes the plurality of pixel circuits 40. FIG. 12 is an enlarged plan view of the pixel circuits 40. The pixel circuits 40 are arranged in a matrix along a plurality of rows and a plurality of columns. In the following description, the rows or columns of the pixel circuits 40 are also simply referred to as "rows" or "columns". FIG. 19 is a cross-sectional view of the detection device 1, taken along the line XIX-XIX in FIG. 11. FIG. 20 is a cross-sectional view of the detection device 1, taken along the line XX-XX in FIG. 11. As shown in FIG. 19 and FIG. 20, each pixel circuit 40 includes a first layer, a second layer, a third layer, a fourth layer, and a fifth layer. The first layer includes semiconductor layers 41*a* and 45*a*. The second layer includes gate electrodes 41*g* and 45*g*. The third layer includes the second power supply line 12, the detection line 14, and the like. The fourth layer includes the scanning line 10, a first power supply line 11*b*, and the like. The fifth layer includes a first power supply line 11*a*, and the like. FIG. 13 is a plan view that only shows the components of the first layer and the third layer among the components shown in FIG. 11. FIG. 14 is a plan view that only shows the components of the first layer, the second layer and the fourth layer among the components shown in FIG. 11. FIG. 15 is a plan view that shows the components of the first layer and the fifth layer among the components shown in FIG. 11.

First, the configuration of the pixel circuit 40 will be described with reference to the cross-sectional view shown in FIG. 19. On a substrate 5, a base insulating film 51 made of silicon oxide, or the like, is formed. The substrate 5 may employ a quartz substrate, a glass substrate, or the like. The first layer includes the semiconductor layers 41*a* and 45*a* and is formed on the base insulating film 51. A gate insulating film 52 made of silicon oxide, or the like, is formed on the first layer. The second layer includes the gate electrodes 41*g* and 45*g* and is formed on the first layer.

The semiconductor layer 41*a* is, for example, formed of a polysilicon film as a silicon film, and includes a channel region 41*c*, a drain region 41*d* and a source region 41*s*. A channel is formed in the channel region 41*c* by an electric field applied from the gate electrode 41*g*. The drain region 41*d* serves as a first terminal. The source region 41*s* serves as a second terminal. The semiconductor layer 45*a* is also formed of a polysilicon film, and includes a channel region 45*c*, a drain region 45*d*, and a source region 45*s*. A channel is formed in the channel region 45*c* by an electric field applied from the gate electrode 45*g*. The drain region 45*d* serves as a first terminal. The source region 45*s* serves as a second terminal. The semiconductor layers 41*a* and 45*a* each may have an Lightly Doped Drain (LDD) structure. For example, a lightly doped drain region may be provided between the channel region 41*c* (45*c*) and the drain region 41*d* (45*d*), and a lightly doped source region may be provided between the channel region 41*c* (45*c*) and the source region 41*s* (45*s*).

The gate electrodes 41*g* and 45*g* each may be, for example, formed of a metal element substance, an alloy, a metal silicide, or a polysilicide, which include at least one of refractory metals, such as Ti (titanium), Cr (chromium), W (tungsten), Ta (tantalum) or Mo (molybdenum), or a laminate of at least two of the metal element substance, the alloy, the metal silicide or the polysilicide, or a conductive polysilicon, or the like. The gate electrode 41*g* is at least formed in a region that overlaps the channel region 41*c* in plan view. The gate electrode 45*g* is at least formed in a region that overlaps the channel region 45*c* in plan view. Here, the phrase "in plan view" means that "when viewed in a direction that is normal to the substrate 5" (the same applies to the following description).

As shown in FIG. 14, each of the semiconductor layers 41*a* and a corresponding one of the semiconductor layers 45*a* are arranged so as to be parallel to each other. That is, each semiconductor layer 41*a* is provided so as to extend in a direction in which the corresponding semiconductor layer 45*a* extends. Thus, the direction of the channel length of each channel region 41*c* is oriented along the direction of the channel length of the corresponding channel region 45*c*. Alternatively, the direction of the channel length of each channel region 41*c* may be parallel to the direction of the channel length of the corresponding channel region 45*c*. Here, the channel region 41*c* (45*c*) is a region that overlaps the gate electrode 41*g* (45*g*) within the semiconductor layer 41*a* (45*a*), and the channel length represents the length at which the channel region 41*c* (45*c*) extends along a direction from the drain region 41*d* (45*d*) toward the source region 41*s* (45*s*). According to the above configuration, because each set of the channel region 41*c* and the channel region 45*c* may be arranged in a minimum area, it is possible to arrange the amplifier transistors 45 and the reset transistors 41 in high density. In addition, when the semiconductor layers 41*a* and 45*a* are formed of low temperature polysilicon that is formed through laser annealing, it is advantageous in that the transistor characteristics may be controlled using the size of each of the channel regions 41*c* and 45*c*. Furthermore, particularly, when the semiconductor layers 41*a* and 45*a* are formed of low temperature polysilicon, it is possible to uniform the current characteristics of the amplifier transistors 45 and the reset transistors 41. Thus, it is possible to, for example, uniform an on electric current or an off electric current between the amplifier transistor 45 and the reset transistor 41. In the detection device 1, when a certain pixel circuit 40 is kept inoperative, both the amplifier transistor 45 and the reset transistor 41 must be reliably held in an off state. According to the above configuration, this operation may be easily performed.

More specifically, the amplifier transistor 45, when it allows the pixel circuit 40 to operate, needs to be configured so that the sensitivity of an output electric current is increased with respect to the gate electric potential around a threshold range. In addition, when the pixel circuit 40 is not allowed to operate, in order to obtain S/N ratio of the detection signal Xn regarding the pixel circuits 40 to be operated, it is necessary to reliably turn off the pixel circuit 40. Moreover, the reset transistor 41 is able to reliably make the gate electric potential of the amplifier transistor 45 at the time of light detection be held in such a manner that the reset transistor 41 reliably enters an off state as the electric potential of the scanning line 10 attains a low level. Thus, it is possible to improve the S/N ratio of the detection signal Xn. As described above, the direction of the channel length of each channel region 41*c* is oriented in a direction along the channel length of the corresponding channel region 45*c*, so that it is easy to perform the above operations.

In addition, as shown in FIG. 11, the channel length of each of the channel regions 41*c* and 45*c* is arranged so that the direction in which the channel length extends in plan view intersects with both the direction in which the scanning lines 10 extend and the direction in which the detection lines 14 extend. Alternatively, the channel length may be arranged so that the direction in which the channel length extends coincides with a direction along the diagonal direction of the pixel circuit 40. Alternatively, the channel length may be arranged so that the direction in which the channel length extends makes an angle of 45 degrees with both the direction in which the scanning lines 10 extend and the direction in which the detection lines 14 extend. Similarly, the direction in which the channel length extends may intersect or make an angle of 45 degrees with the first power supply lines 11*a* and 11*b* and the second power supply lines 12. Note that, in the present embodiment, the scanning lines 10 and the first power supply lines 11a and 11b are arranged in a horizontal direction (row direction) in the drawing, and the second power supply lines 12 and the detection lines 14 are arranged in a vertical direction (column direction) in the drawing. According to the above configuration, because a pitch at which the channel regions 41c and 45c are arranged in the vertical direction and in the horizontal direction in FIG. 11, that is, a pitch at which the semiconductor layers 41a and 45a are arranged, may be reduced, it is possible to reduce the size of each pixel circuit 40. In this manner, it is possible to improve the resolution of the detection device 1.

Here, when the semiconductor layers 41a and 45a are made of low temperature polysilicon that is formed by laser annealing, the channel regions 41c and 45c are desirably arranged so as to make an angle of 45 degrees with the longitudinal direction of light flux of annealing laser. If so doing, it is possible to complete annealing on the semiconductor layers 41a and 45a with a small number of laser irradiations. Thus, it is possible to reduce variation in the characteristic of each of the semiconductor layers 41a and 45a due to laser annealing.

In addition, as shown in FIG. 11, each amplifier transistor 45 is formed so that both the drain region 45d (first terminal) and the source region 45s (second terminal) are arranged along a direction that intersects with the directions in which the scanning line 10, the first power supply lines 11a and 11b, the second power supply line 12 and the detection line 14 extend in plan view. Alternatively, both the drain region 45d and the source region 45s may be arranged along the diagonal direction of the pixel circuit 40. Alternatively, both the drain region 45d and the source region 45s may be arranged along the direction that makes an angle of 45 degrees with the scanning line 10. Similarly, each reset transistor 41 is arranged along a direction in which both the drain region 41d (first terminal) and the source region 41s (second terminal) intersect with the directions in which the scanning line 10, the first power supply lines 11a and 11b, the second power supply line 12 and the detection line 14 extend in plan view. Alternatively, both the drain region 41d and the source region 41s may be arranged along the diagonal direction of the pixel circuit 40. Alternatively, both the drain region 41d and the source region 41s may be arranged along the direction that makes an angle of 45 degrees with the scanning line 10. According to the above configuration, the first terminal and second terminal of each transistor may be arranged in a state where the first terminal and the second terminal are spaced apart from each other. In addition, when wirings that extend in the vertical direction and in the horizontal direction in FIG. 11 are arranged, it is possible to linearly arrange the wirings in such a manner that areas that overlap the amplifier transistor 45 or the reset transistor 41 are suppressed to the minimum amount. Thus, it is possible to prevent a signal delay due to complex wirings.

Furthermore, as shown in FIG. 11, the drain region 45d of the amplifier transistor 45 and the drain region 41d of the reset transistor 41 are aligned along the directions in which the scanning line 10 and the first power supply lines 11a and 11b extend in plan view. In addition, the source region 45s of the amplifier transistor 45 and the source region 41s of the reset transistor 41 are aligned along the directions in which the scanning line 10 and the first power supply lines 11a and 11b extend in plan view. According to the above configuration, the wirings that extend in the horizontal direction (row direction) in FIG. 11, that is, the scanning lines 10 and the first power supply lines 11a and 11b, may be linearly arranged. Thus, it is possible to prevent a signal delay due to complex wirings.

In addition, each gate electrode 45g is provided so as to extend to a position that overlaps the drain region 41d of the reset transistor 41 in plan view, and is electrically connected through a contact hole 72 (see FIG. 19) to the drain region 41d. In this manner, the amplifier transistor 45 may be controlled using the output of the reset transistor 41. The semiconductor layers 41a and 45a are arranged as described above, so that each drain region 41d is located on a line segment that extends from the channel region 45c in the minor axis direction of the semiconductor layer 45a, that is, on a perpendicular bisector of the semiconductor layer 45a. Thus, the gate electrode 45g simply extends from the area on the channel region 45c in the minor axis direction of the semiconductor layer 45a and, therefore, may be formed easily to the area on the drain region 41d. In addition, it is possible to ensure a wide contact portion in the drain region 41d.

Referring back to FIG. 19, on the second layer, the third layer that includes the second power supply line 12, the detection line 14, and the like, is formed through an interlayer insulating film 53 made of silicon oxide, or the like. In addition, relay electrodes 61, 62 and 65 (see FIG. 13 and FIG. 20) are also formed in the third layer. The second power supply line 12 is electrically connected to the source region 41s of the reset transistor 41 through a contact hole 71, which is provided so as to extend through the interlayer insulating film 53 and the gate insulating film 52. The detection line 14 is electrically connected to the drain region 45d of the amplifier transistor 45 through a contact hole 73, which is provided so as to extend through the interlayer insulating film 53 and the gate insulating film 52. The relay electrode 61 is electrically connected to the drain region 41d of the reset transistor 41 through a contact hole 72, which is provided so as to extend through the interlayer insulating film 53 and the gate insulating film 52. The relay electrodes 62 and 65 each are electrically connected to the source region 45s of the amplifier transistor 45 through a contact hole 74, which is provided so as to extend through the interlayer insulating film 53 and the gate insulating film 52.

The planar arrangement of the components of the third layer is shown in FIG. 13. Both the second power supply lines 12 and the detection lines 14 extend along the column direction of the pixel circuits 40 (see FIG. 11), the second power supply lines 12 each are arranged on the left side to the pixel circuit 40 in FIG. 13, and the detection lines 14 each are arranged on the right side to the pixel circuit 40 in FIG. 13. Thus, in each of the pixel circuits 40, both the amplifier transistor 45 and the reset transistor 41 are arranged between the second power supply line 12 and the detection line 14 in plan view. In other words, the connecting portion at which the second power supply line 12 is connected to the reset transistor 41 and the connecting portion at which the detection line 14 is connected to the amplifier transistor 45 are positioned closer to the outer peripheral portion of the pixel circuit 40 than the channel regions 41c and 45c (see FIG. 11) are. According to the above configuration, the wirings that extend in the vertical direction (column direction) in FIG. 11, that is, the second power supply lines 12 and the detection lines 14 may be linearly arranged. Thus, it is possible to prevent a signal delay due to complex wirings.

The relay electrode 61 is at least arranged in a region, within the drain region 41d (see FIG. 11) of the reset transistor 41, which overlaps the contact hole 72. The relay electrodes 62 and 65 are at least arranged in a region, within the source region 45s of the amplifier transistor 45, which overlaps the contact hole 74. Here, the relay electrode 62 is arranged in the pixel circuit 40 in a row, and the relay electrode 65 is arranged in the pixel circuit 40 in a row next to the above pixel circuit 40. That is, the relay electrodes 62 and 65 each are arranged on every other row. More specifically, the relay electrode 62 is formed in each pixel circuit 40 that includes the first power supply line 11a (see FIG. 11), and the relay electrode 65 is formed in each pixel circuit 40 that includes the first power supply line 11b (see FIG. 11). Each relay electrode 65 extends to a region in which a contact hole 78 (see FIG. 14) is arranged within a region in which the first power supply line 11b is arranged.

Referring back to FIG. 19, on the third layer, the fourth layer that includes the scanning line 10, and the like, is formed through an interlayer insulating film 54 made of silicon oxide, or the like. The first power supply line 11b is also formed in the fourth layer in addition to the scanning line 10 (see FIG. 14 and FIG. 20). The scanning line 10 is electrically connected to the gate electrode 41g of the reset transistor 41 through a contact hole 75, which is provided so as to extend through the interlayer insulating films 54 and 53. The first power supply line 11b is electrically connected to the relay electrode 65 (see FIG. 20) through the contact hole 78, which is provided so as to extend through the interlayer insulating films 54 and 53. Here, because the relay electrode 65 is connected to the source region 45s of the amplifier transistor 45, the first power supply line 11b is electrically connected to the source region 45s. As will be described later, in the present embodiment, two types of first power supply lines 11a and 11b, which serve as a first power supply line, are formed in different layers from each other. The first power supply line 11b in the third layer is one of them.

The planar arrangement of the components of the fourth layer is shown in FIG. 14. The scanning line 10 is arranged so as to at least partly overlap the gate electrode 41g of the reset transistor 41 in plan view. In the present embodiment, furthermore, each scanning line 10 is linearly arranged so as to cross over the channel region 45c of the amplifier transistor 45 and the channel region 41c of the reset transistor 41. In addition, each scanning line 10 is arranged to make a certain angle with the direction of the channel length of each of the channel regions 41c and 45c. In the present embodiment, the certain angle is 45 degrees. In addition, as described above, the scanning line 10 and the gate electrode 41g of the reset transistor 41 are electrically connected through the contact hole 75, which is formed in the normal direction of the substrate 5 on the gate electrode 41g. In this manner, each scanning line 10 is arranged so as to cross over the two transistors in a layer that is different from the second layer or the third layer, and is connected to the gate electrode 41g in the normal direction of the substrate 5. Thus, it is not necessary to additionally provide a region for wiring the scanning lines 10, and a region for a wiring that connects the scanning line 10 and the reset transistor 41 is not required. Thus, it is possible to arrange the amplifier transistors 45 and the reset transistors 41 in high density. In the present description, the connection in the normal direction to the substrate 5, when the connection is, for example, established using a contact hole, means that the direction in which the contact hole is formed has a component of the normal direction to the substrate 5, and is not limited to the case where the contact hole is strictly formed along the normal direction to the substrate 5.

The first power supply lines 11b are arranged parallel to the scanning line 10, that is, arranged linearly along the row direction. The first power supply lines 11b are arranged on every other row.

Referring back to FIG. 19, on the fourth layer, the fifth layer that includes the first power supply line 11a and the relay electrodes 63 and 64 (see FIG. 20) is formed through an interlayer insulating film 55 made of silicon oxide, or the like. The first power supply line 11a is the other one of two types of the first power supply line 11. Each first power supply line 11a is electrically connected to the relay electrode 62 through a contact hole 77, which is provided so as to extend through the interlayer insulating films 55 and 54. Here, because the relay electrode 62 is connected to the source region 45s of the amplifier transistor 45, the first power supply line 11a is electrically connected to the source region 45s. The relay electrode 63 is electrically connected to the relay electrode 61 through a contact hole 76, which is provided so as to extend through the interlayer insulating films 55 and 54. The relay electrode 64 is electrically connected to the relay electrode 65 through the contact hole 77, which is provided so as to extend through the interlayer insulating films 55 and 54.

The planar arrangement of the components of the fifth layer is shown in FIG. 15. The first power supply line 11a is arranged along the row direction of the pixel circuits 40 and is partly arranged to jut into a region in which the contact holes 74 and 77 are arranged. The relay electrode 63 is at least arranged in a region, within the drain region 41d of the reset transistor 41, which overlaps the contact holes 72 and 76. The relay electrode 64 is at least arranged in a region, within the source region 45s of the amplifier transistor 45, which overlaps the contact holes 74 and 77. The relay electrode 64 is arranged only in the pixel circuit 40 that includes the first power supply line 11b.

Figure 17:
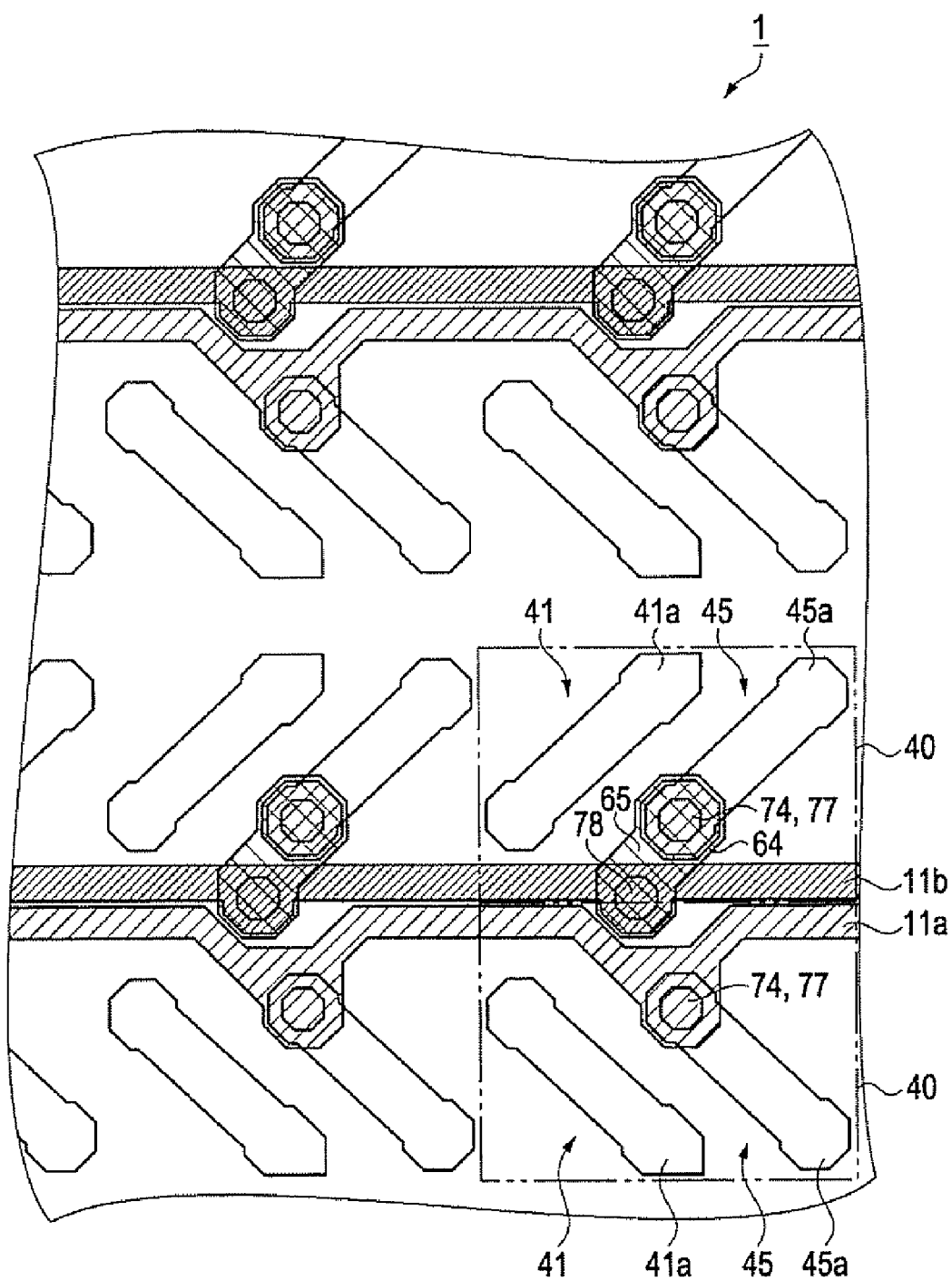
FIG. 17 is a plan view that shows first power supply lines, semiconductor layers, and the like, that are taken out from FIG. 11.

Here, the arrangement of the first power supply lines 11a and 11b will be described with reference to FIG. 17. FIG. 17 is a plan view that shows the first power supply lines 11a and 11b, the semiconductor layers 41a and 45a, and the like, that are taken out from FIG. 11. The first power supply lines 11a and 11b both are provided so as to extend linearly in a direction parallel to the scanning line 10. More specifically, the first power supply line 11a is formed to the upper end side of the pixel circuit 40, and the first power supply line 11b is formed to the lower end side of the pixel circuit 40. Then, the row of the pixel circuits 40, in which the first power supply line 11a is formed, and the row of the pixel circuits 40, in which the first power supply line 11b is formed, are alternately arranged. Thus, each of the first power supply lines 11a and a corresponding one of the first power supply lines 11b are arranged at positions adjacent to each other in plan view.

In addition, as described above, the first power supply line 11a is formed in the fifth layer (see FIG. 19), and the first power supply line 11b is formed in the fourth layer that is different from the fifth layer (see FIG. 20). Thus, in comparison with the case in which the first power supply lines 11a and 11b are formed in the same layer, the first power supply lines 11a and 11b may be arranged at positions closer to each other in plan view. Thus, it is possible to reduce the pitch in the vertical direction (column direction) in FIG. 17, at which the pixel circuits 40 are arranged.

Figure 18:
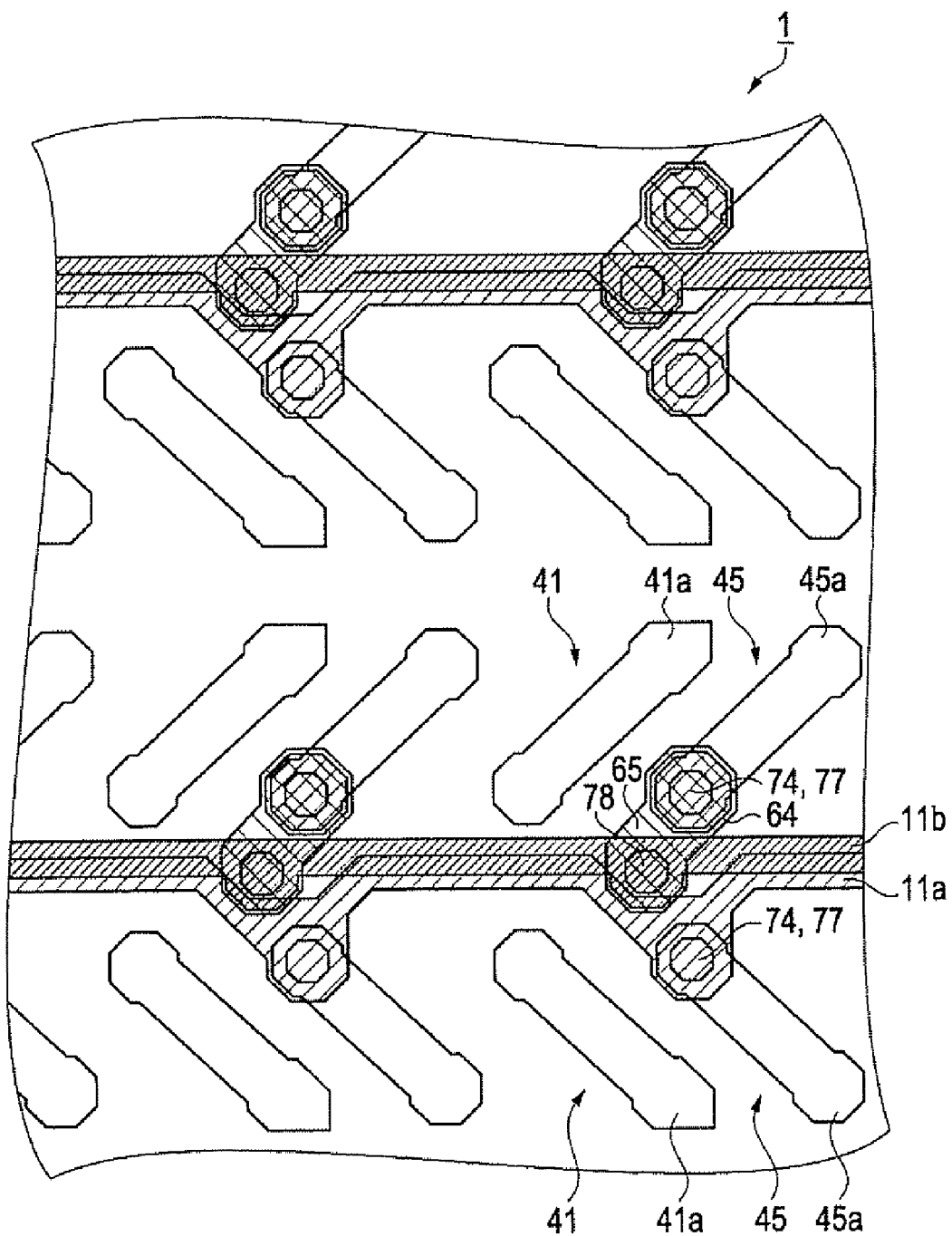
FIG. 18 is a plan view that shows an alternative embodiment of the arrangement of the first power supply lines.

In addition, as shown in FIG. 18, the first power supply lines 11a and 11b may be arranged so as to partly overlap each other in plan view. If so doing, it is possible to further reduce the pitch in the column direction, at which the pixel circuits 40 are arranged.

Referring back to FIG. 19, a planarizing film 56 made of acrylic resin, or the like, is formed on the fifth layer, and the first capacitive element 43 and the photodiode 47, which serves as a detection element, are laminated in this order on the planarizing film 56. The first capacitive element 43 and the photodiode 47 are formed in each of the pixel circuits 40.

The first capacitive element 43 has such a structure that a second electrode 43b made of Al—Nd, or the like, an insulating film 43d made of silicon nitride, or the like, and a first electrode 43a made of Al—Nd, or the like, are laminated in this order from the lower layer side. The second electrode 43b is electrically connected to the first power supply line 11a or the relay electrode 64 (see FIG. 20) through a contact hole 79b, which is formed in the planarizing film 56. Thus, the second electrode 43b is electrically connected to the source region 45s of the amplifier transistor 45 through the relay electrode 62 or the relay electrode 65. The contact hole 79b is formed in a region that overlaps the second electrode 43b in plan view. In addition, the first electrode 43a is electrically connected to the relay electrode 63 through a contact hole 79a, which is fumed in the planarizing film 56. Thus, the first electrode 43a is electrically connected to the drain region 41d of the reset transistor 41 and the gate electrode 45g of the amplifier transistor 45 through the relay electrode 61. The contact hole 79a is formed in a region that overlaps the first electrode 43a in plan view. Thus, according to the configuration that electrical connection is established using the contact holes 79a and 79b that are provided in the normal direction to the substrate 5, the connection may be reliably ensured, and line or space for wirings provided in the same layer may be increased. In addition, the first electrode 43a partly overlaps the semiconductor layer 41a in plan view, and the second electrode 43b partly overlaps the semiconductor layer 45a in plan view. With this feature as well, it is advantageous in that line or space for wirings provided in the same layer may be increased.

Furthermore, the connection of the first electrode 43a with the drain region 41d of the reset transistor 41 and the connection of the gate electrode 45g of the amplifier transistor 45 and the drain region 41d of the reset transistor 41 are established through the same contact hole 72 (common contact structure). According to the above configuration, it is possible to reduce regions used for the contact in plan view, and it is possible to arrange the pixel circuits 40 in high density.

Figure 16:
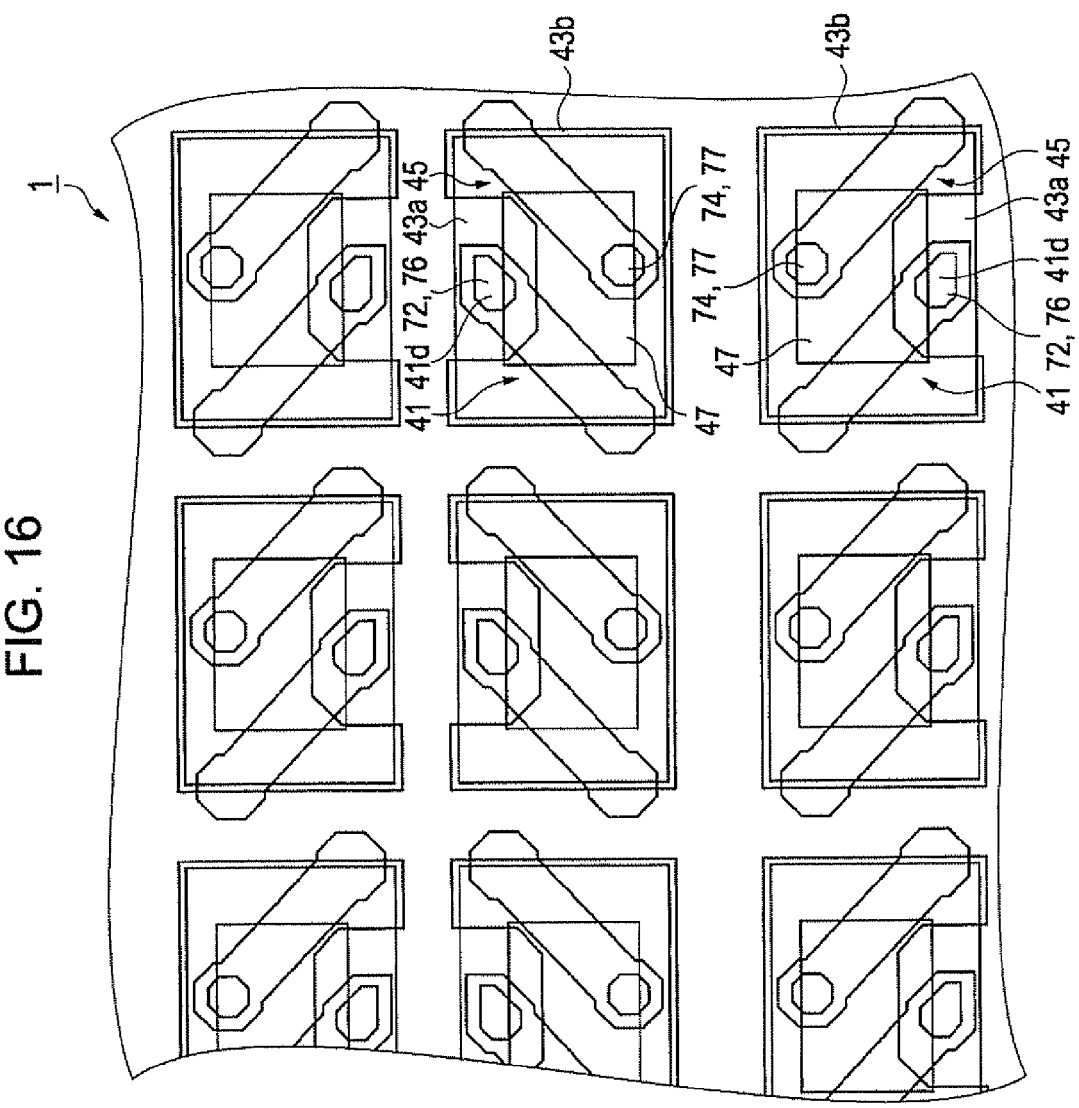
FIG. 16 is a plan view that shows the arrangement of first capacitive elements and photodiodes.

The planar arrangement of the first electrodes 43a and the second electrodes 43b is shown in FIG. 16. Each second electrode 43b is formed in a region, within the pixel circuit 40, except the drain region 41d of the reset transistor 41, and each first electrode 43a is formed over substantially the entire face of the pixel circuit 40. Thus, the channel region 45c of the amplifier transistor 45 and the channel region 41c of the reset transistor 41 are covered with at least one of the first electrode 43a and the second electrode 43b in plan view. According to the above configuration, because the channel regions 45c and 41c (see FIG. 11) may be shielded against light by one or two light shielding layers (the first electrode 43a and/or the second electrode 43b), it is possible to reduce an off electric current that flows through the amplifier transistor 45 or the reset transistor 41. In this manner, it is possible to improve the S/N ratio of the detection signal Xn.

Referring back to FIG. 19, the first electrode 43a of the first capacitive element 43 also serves as the cathode of the photodiode 47. The photodiode 47 has such a structure that the first electrode 43a, which serves as the cathode, an n layer 47n, an i layer 47i and a p layer 47p, which are made of amorphous silicon, and a transparent anode 47 made of Indium Tin Oxide (ITO) are laminated in this order from the lower layer side. The photodiode 47, as shown in FIG. 16, is formed in a rectangular region around the center of the pixel circuit 40 in plan view. An insulating layer 57 made of silicon nitride, or the like, is formed around the rectangular region of the photodiode 47. Thus, according to the configuration that the first electrode 43a of the first capacitive element 43 also serves as the cathode of the photodiode 47 and the photodiode 47 is formed to overlap the first capacitive element 43, it is possible to increase an area occupied by the first capacitive element 43 and an area occupied by the photodiode 47.

Alternative Embodiment 1-1

Figure 21:
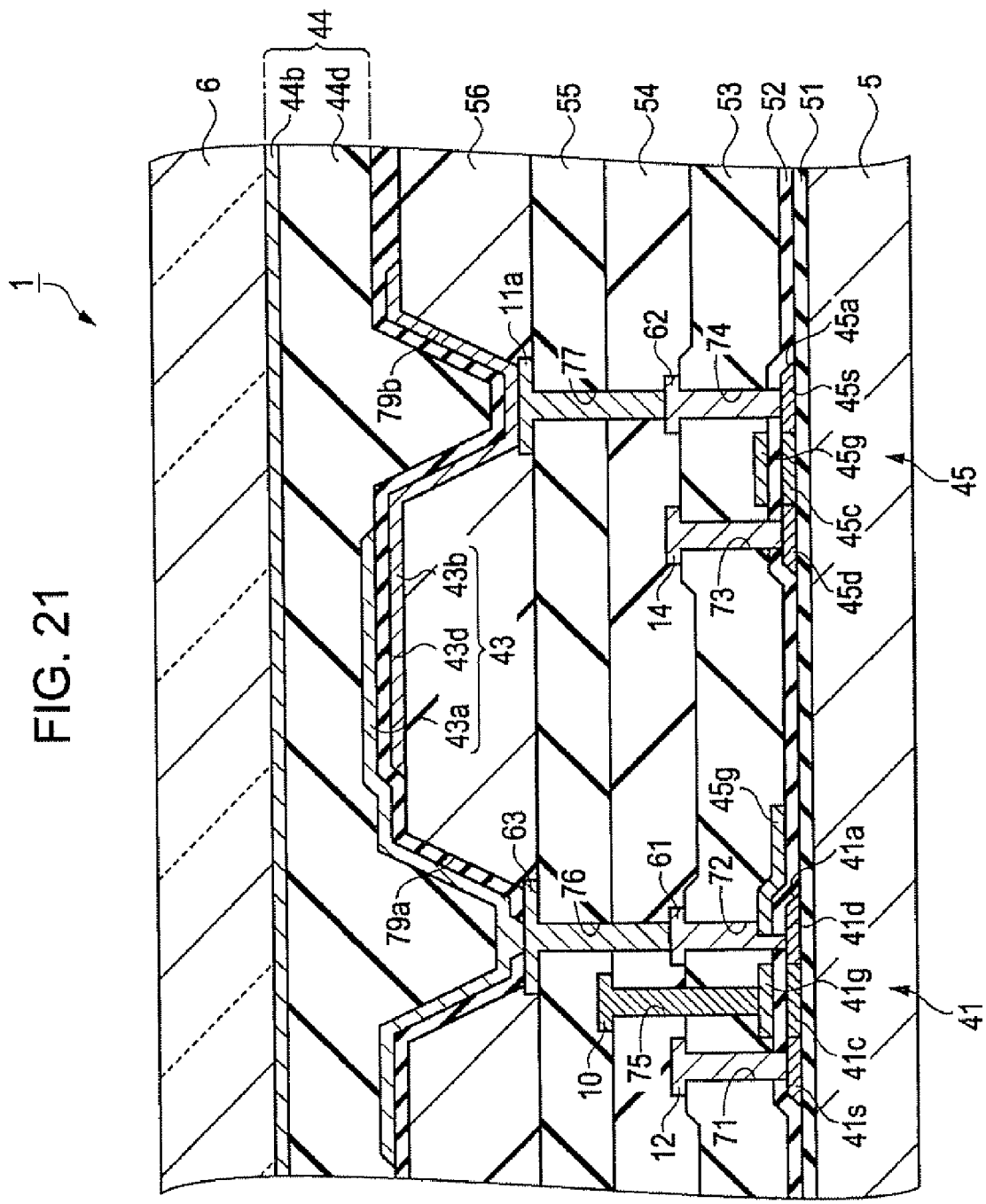
FIG. 21 is a cross-sectional view of the detection device that uses a second capacitive element as a detection element.

The detection device 1 according to the present embodiment uses the photodiode 47 as the detection element; however, various detection elements other than the photodiode 47 may be used. FIG. 21 is a cross-sectional view of the detection device 1 that uses a second capacitive element 44 as the detection element, in which the cross section is taken along the line XIX-XIX in FIG. 11. The second capacitive element 44 is formed so as to overlap the first capacitive element 43, and has such a structure that the first electrode 43a, an insulating layer 44d and a second electrode 44b are laminated from the lower layer side. Here, the first electrode 43a is shared with the first capacitive element 43. A substrate 6 made of glass, transparent resin, or the like, is arranged on the second capacitive element 44. As the substrate 6 is deformed because of an external factor, the thickness of the insulating layer 44d varies and, in accordance with the variation, the capacitance of the second capacitive element 44 varies. As a result, the amount of charge stored in the second capacitive element 44 fluctuates and, therefore, the gate electric potential of the amplifier transistor 45 varies. In this manner, the second capacitive element 44 varies the gate electric potential of the amplifier transistor 45 depending on an external factor. Thus, even when the detection device 1 that uses the second capacitive element 44 as the detection element, it is possible to detect an external factor.

Alternative Embodiment 1-2

Figure 22:
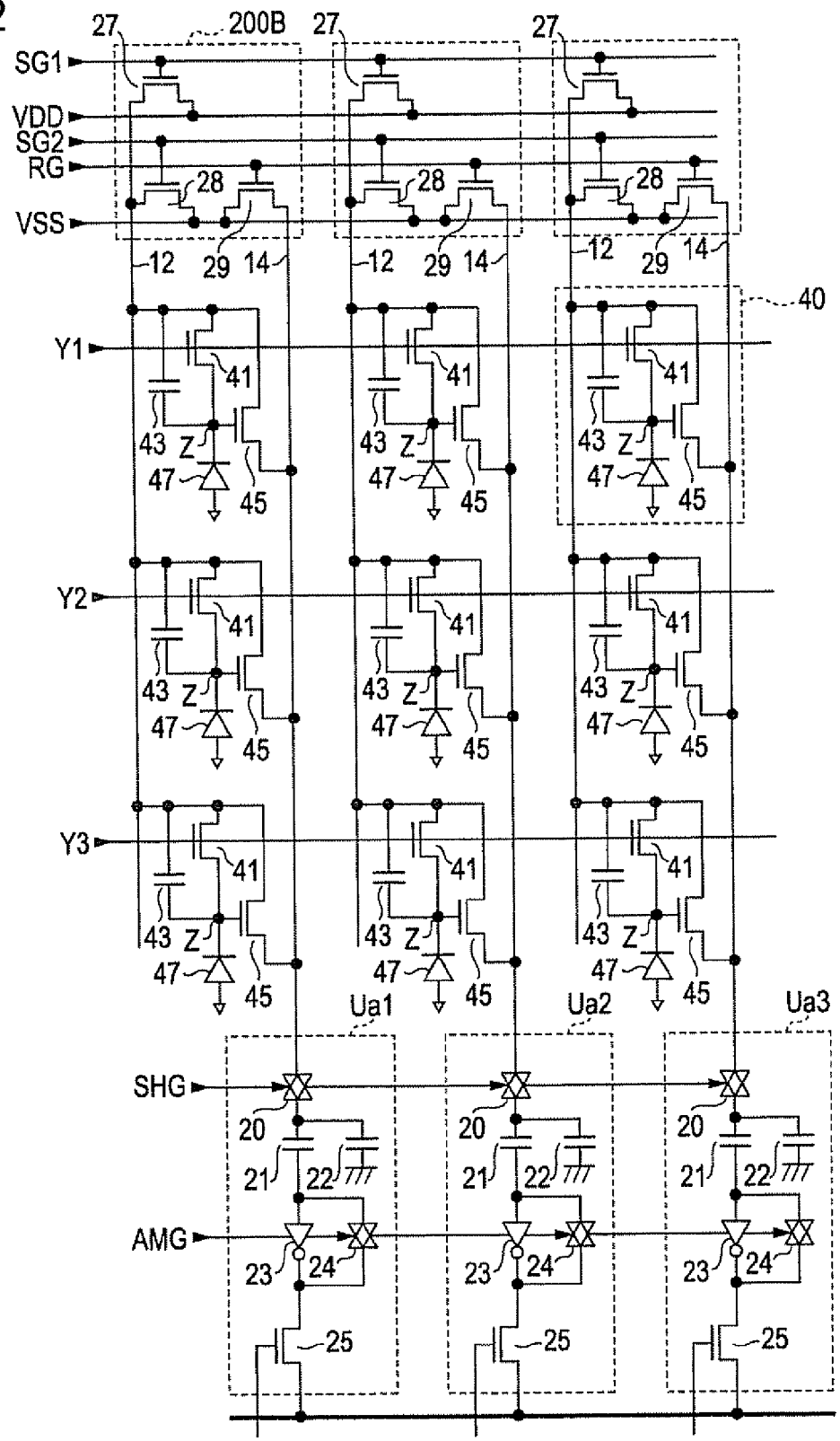
FIG. 22 is a circuit diagram of the detection device according to an alternative embodiment 1-2.

The detection device 1 according to the present embodiment includes two power supply lines (the first power supply line 11 and the second power supply line 12) in each pixel circuit 40; however, these power supply lines may be electrically connected to form a common power supply line and then each pixel circuit 40 may have a single power supply line. FIG. 22 is a circuit diagram of the detection device 1 that includes the above configured pixel circuits 40. In each of the pixel circuits 40, one terminal of the first capacitive element 43 is electrically connected to the second power supply line 12 (in the present alternative embodiment, simply referred to as the power supply line 12). In addition, one end (source or drain) of each of the reset transistor 41 and the amplifier transistor 45 is electrically connected to the power supply line 12. If so doing, it is possible to supply a power supply voltage RSL to the terminal of the first capacitive element 43 and one end of each of the reset transistor 41 and the amplifier transistor 45 through the power supply line 12. Here, the power supply voltage RSL will be the first power supply electric potential VDD or the second power supply electric potential VSS.

With the above configuration as well, the same detection operation as in the case of the above embodiment may be performed. That is, first, during the reset period Trest, the reset transistor 41 is in an on state and, thereby, the second power supply electric potential VSS is supplied through the power supply line 12 to the gate of the amplifier transistor 45. In addition, the detection line 14 is precharged at the second power supply electric potential VSS. Next, during the initialization period Tini, in the row in which any one of the scanning signals Y1 to Ym is at a high level, the first power supply electric potential VDD is supplied through the power supply line 12 and the reset transistor 41 to the gate of the amplifier transistor 45. At this time, the other end of the first capacitive element 43 is also supplied with the first power supply electric potential VDD through the power supply line 12. Next, during the detection period Tdet, detection signals X1 to X3 are output from the pixel circuits 40 in the selected row. At this time, the amplifier transistors 45 output the detection signals X1 to X3 of which the magnitudes correspond to the gate electric potentials. Here, because the gate electric potential of the amplifier transistor 45 varies in accordance with the amount of light that enters the photodiode 47, the detection signals X1 to X3 become the magnitudes corresponding to the amount of the incident light.

Figure 23:
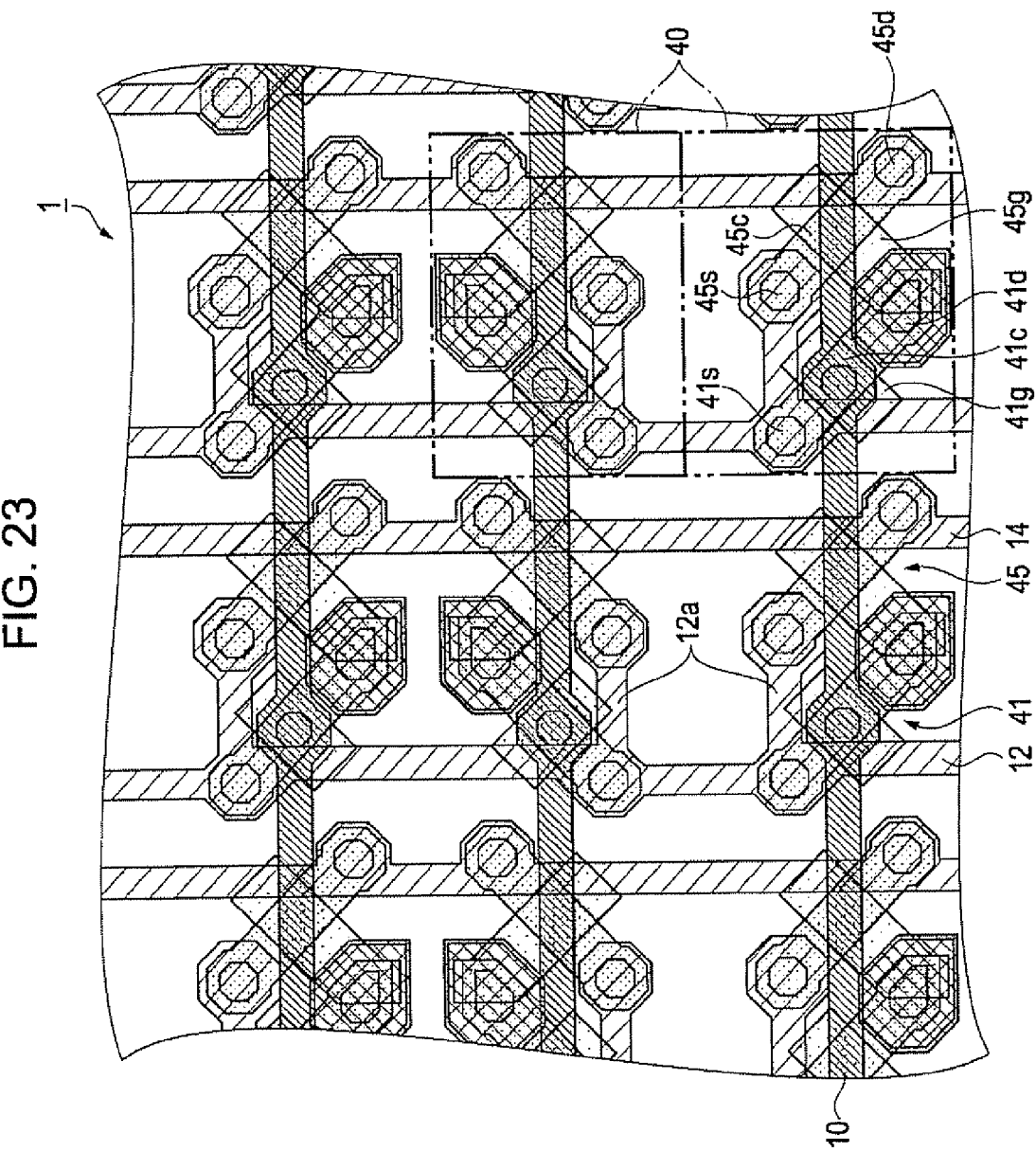
FIG. 23 is a plan view of the detection device in a region that includes a plurality of pixel circuits according to the alternative embodiment 1-2.
Figure 24:
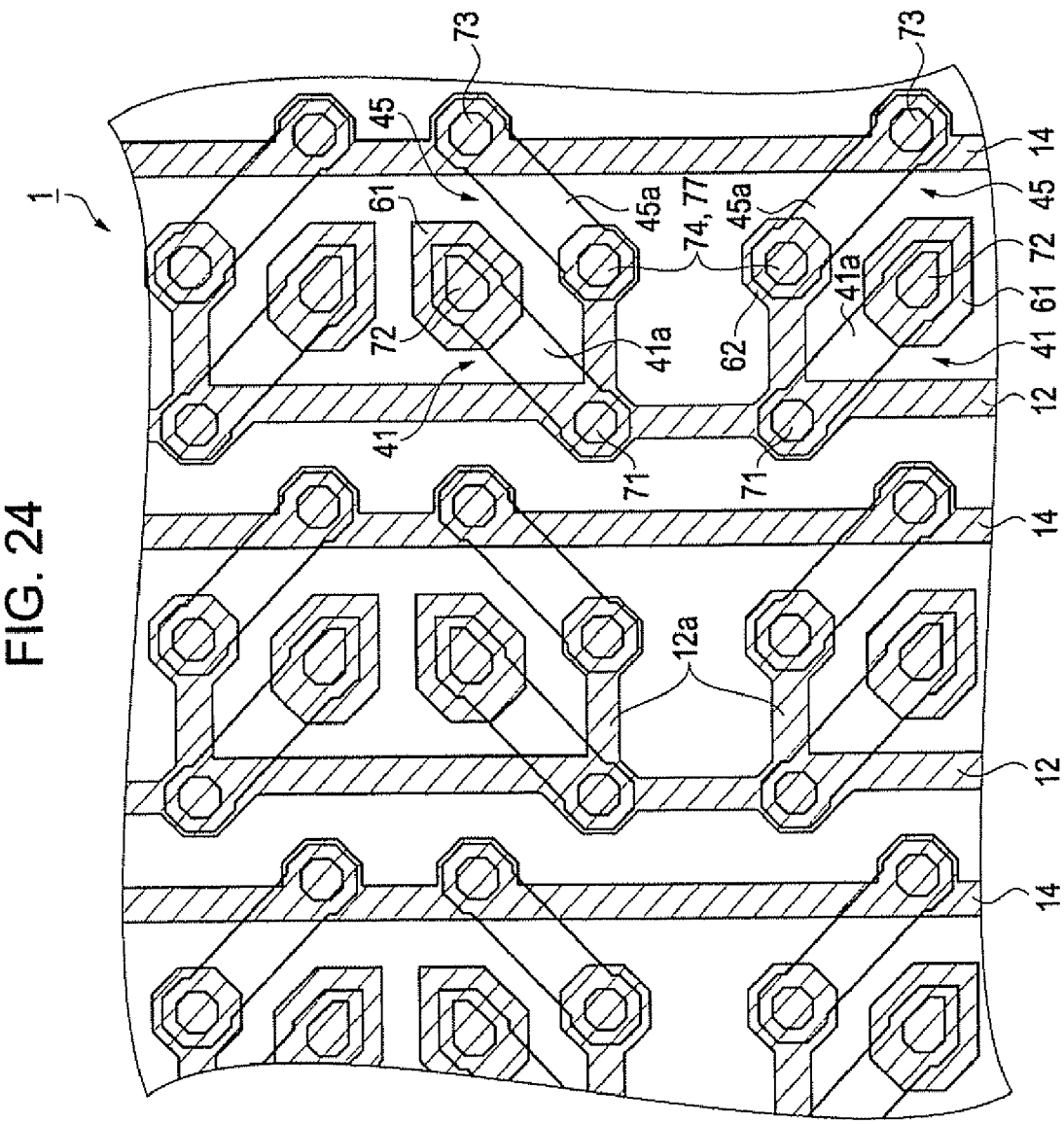
FIG. 24 is a plan view that shows the arrangement of a first layer and a third layer among the components shown in FIG. 23.

FIG. 23 is a plan view of the detection device 1 in a region that includes the plurality of pixel circuits 40 according to the present alternative embodiment. In addition, FIG. 24 is a plan view that shows the arrangement of the first layer (layer in which the semiconductor layers 41a and 45a are formed) and the third layer (layer in which the power supply lines 12 are formed) among the components shown in FIG. 23. As shown in these drawings, the power supply lines 12 are arranged along the vertical direction (column direction) in the drawing. Each of the power supply lines 12 includes branch portions 12a that are connected respectively to the source region 41s and the source region 45s in each of the pixel circuits 40. The branch portions 12a are electrically connected through the contact holes 71 and 74 to the source region 41s and the source region 45s, respectively. In addition, the source regions 41s and 45s both are electrically connected through the contact hole 77 to the second electrode 43b of the first capacitive element 43.

The detection device 1 according to the present alternative embodiment does not include a first power supply line 11a or 11b. Thus, it is possible to omit the fifth layer (see FIG. 15), which includes the first power supply line 11a and the relay electrodes 63 and 64 and which is provided in the first embodiment. In this case, it is only necessary that other relay electrodes are provided at positions corresponding to the relay electrodes 63 and 64 in the fourth layer that includes the scanning lines 10 and the relay electrodes are electrically connected to the first electrode 43a and the second electrode 43b of the first capacitive element 43, respectively.

According to the configuration of the present alternative embodiment, because each pixel circuit (unit circuit) 40 includes only the single power supply line 12, it is possible to simplify the circuitry of the detection device 1 in comparison with the configuration that each pixel circuit 40 includes a plurality of power supply lines. In addition, because it is not necessary to form a plurality of power supply lines 12 in each pixel circuit 40 in different layers, it is possible to simplify the layer structure of each pixel circuit 40. Furthermore, the area in which the power supply lines 12 are arranged may be reduced and, hence, the pixel circuits 40 may be formed in further high density.

Second Embodiment

Next, a detection device according to a second embodiment will be described. The detection device according to the present embodiment differs from that of the first embodiment in the manner in which the components of each pixel circuit 40 are arranged, and the other configuration is the same as that of the first embodiment.

Figure 25:
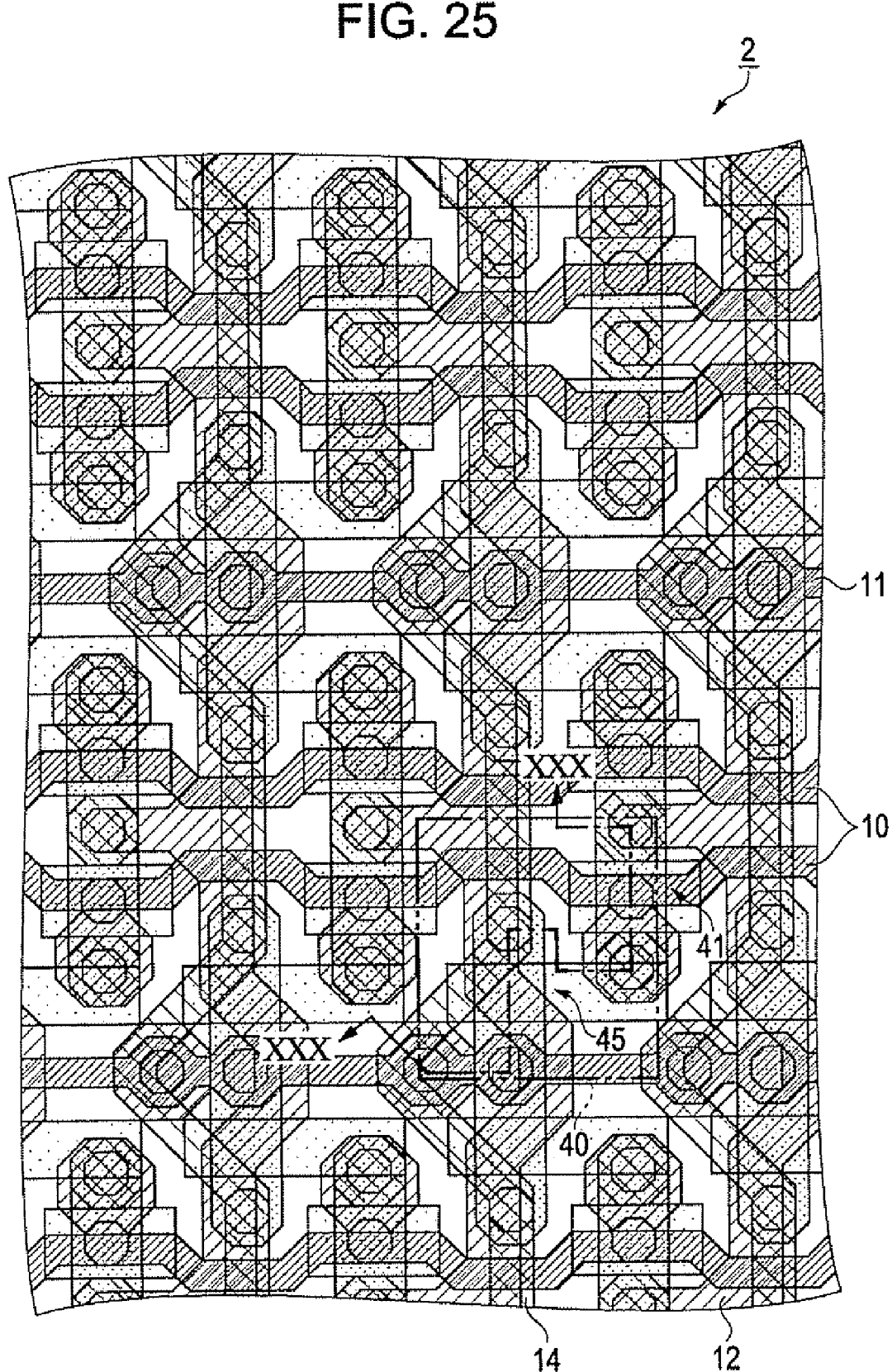
FIG. 25 is a plan view of the detection device in a region that includes a plurality of pixel circuits.
Figure 26:
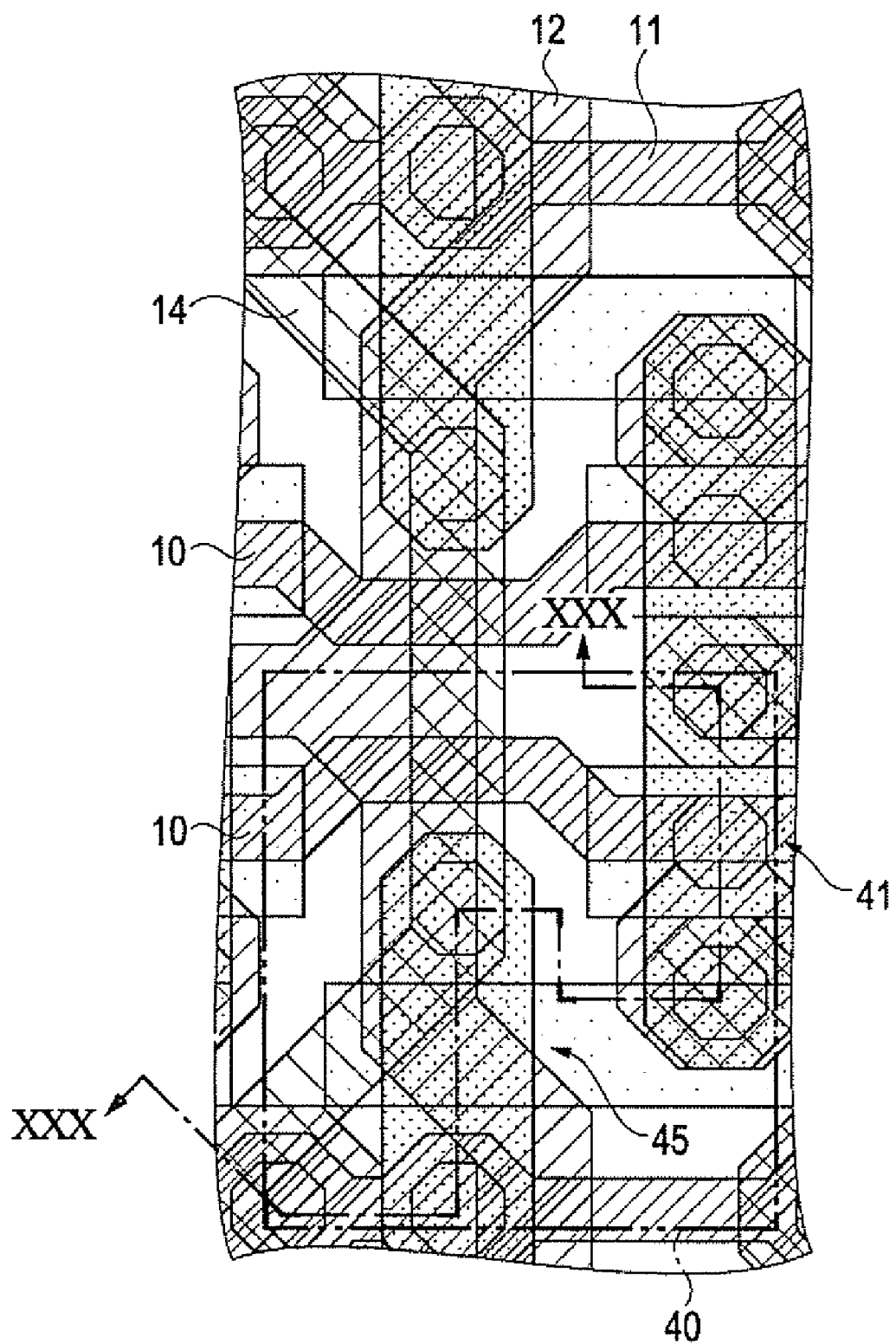
FIG. 26 is an enlarged plan view of a pixel circuit.
Figure 27:
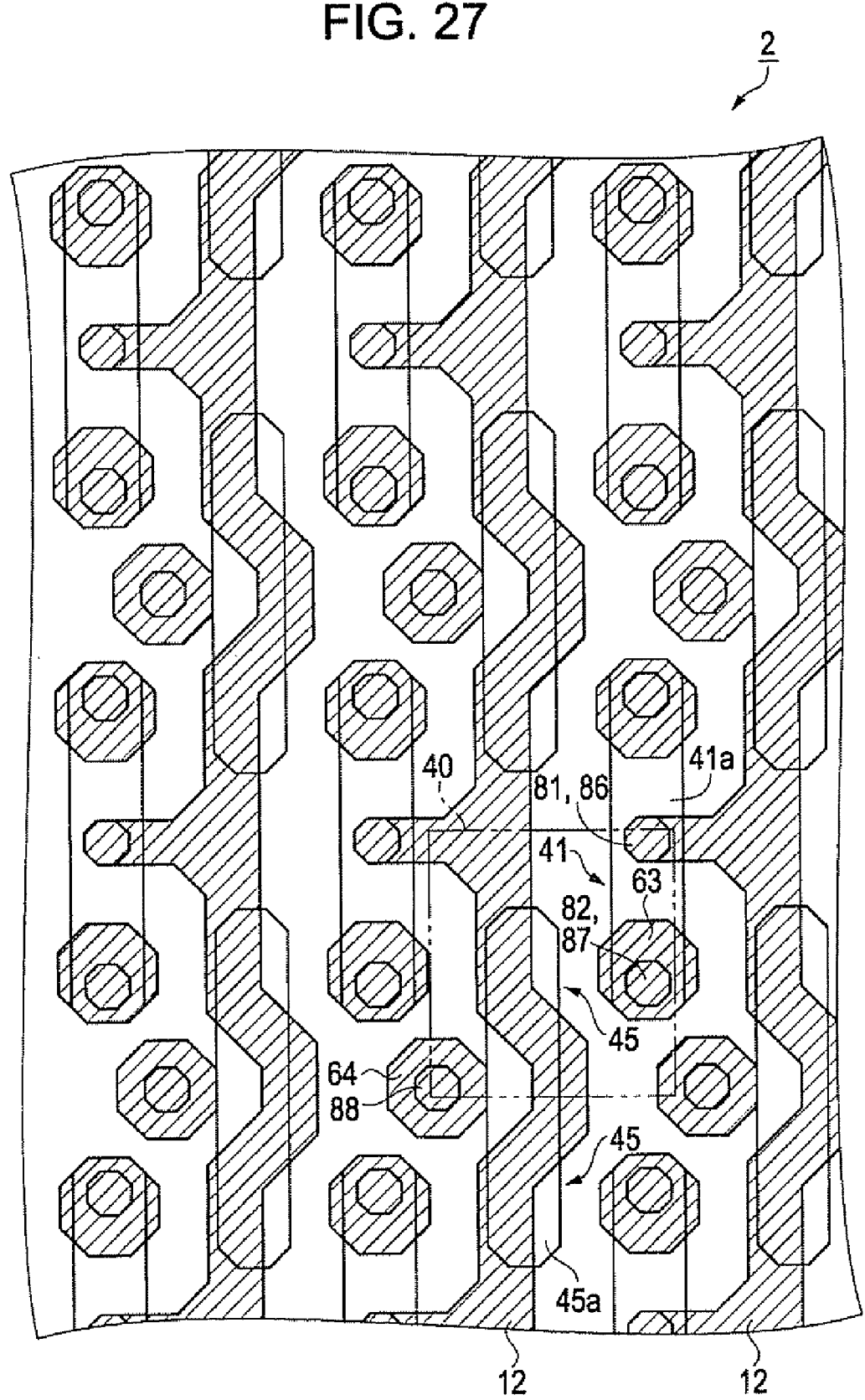
FIG. 27 is a plan view that shows the arrangement of the first layer and a fifth layer among the components shown in FIG. 25.
Figure 28:
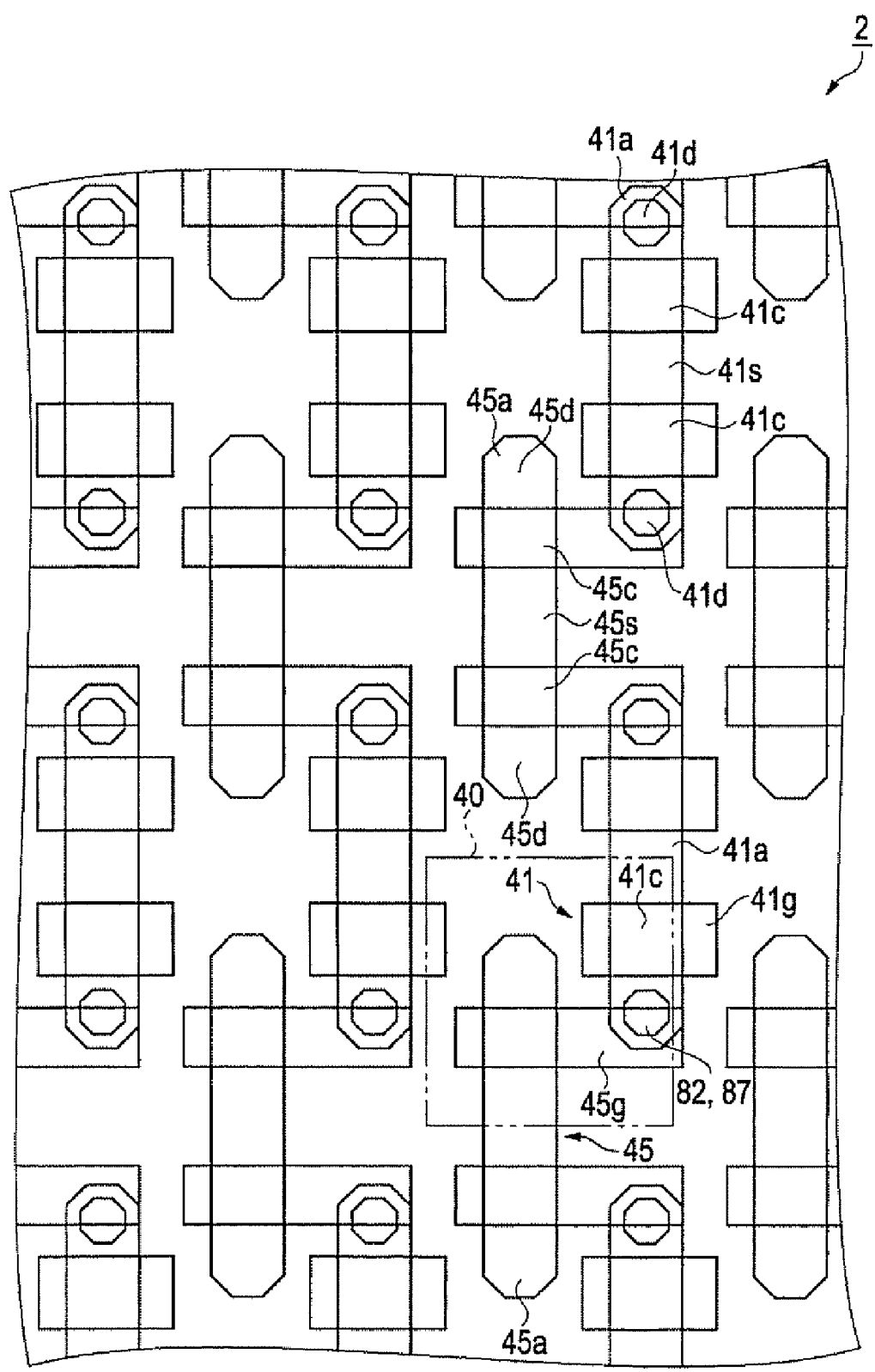
FIG. 28 is a plan view that shows the arrangement of the first layer and a second layer among the components shown in FIG. 25.
Figure 29:
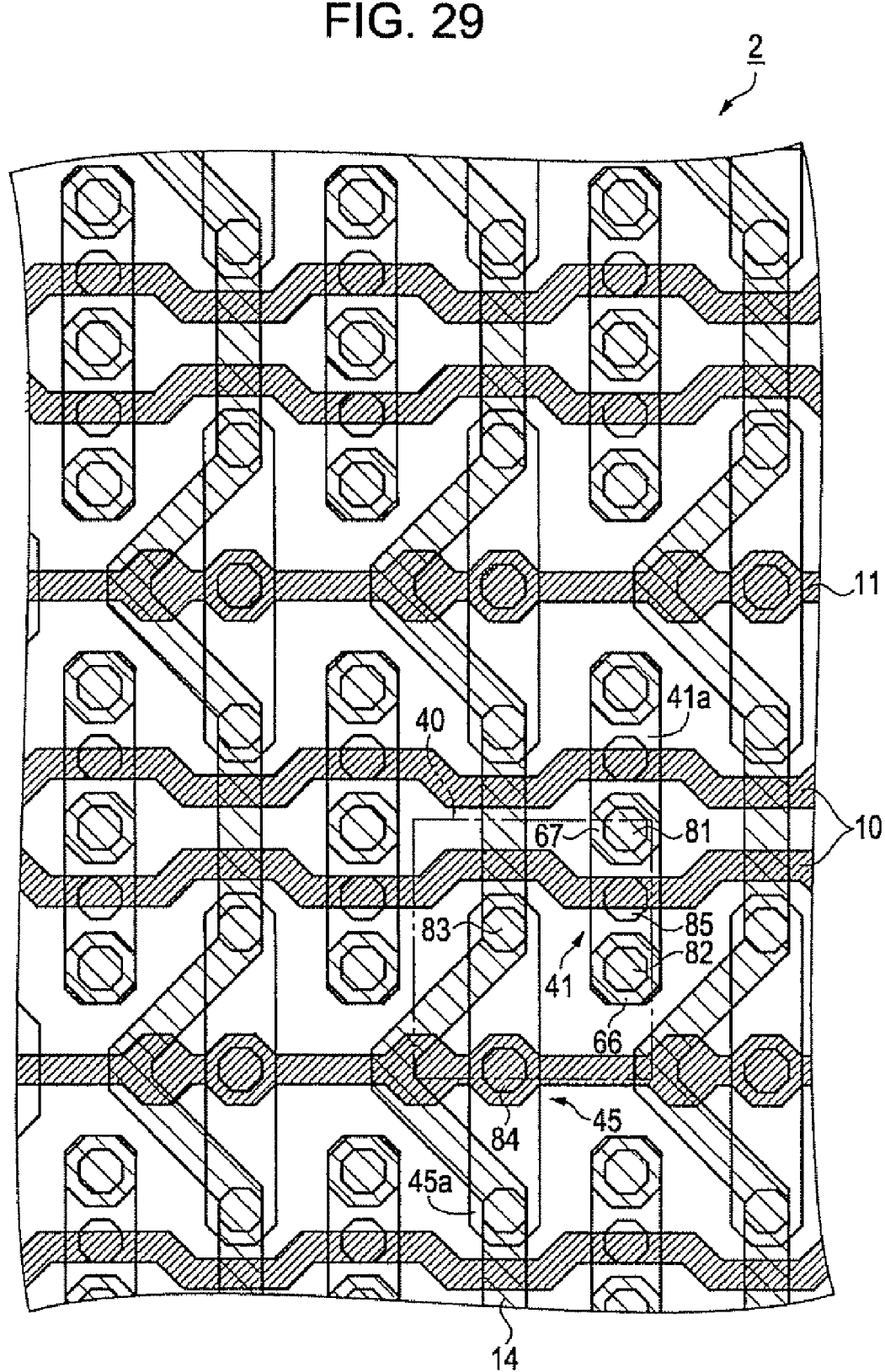
FIG. 29 is a plan view that shows the arrangement of the first layer, the third layer and a fourth layer among the components shown in FIG. 25.
Figure 30:
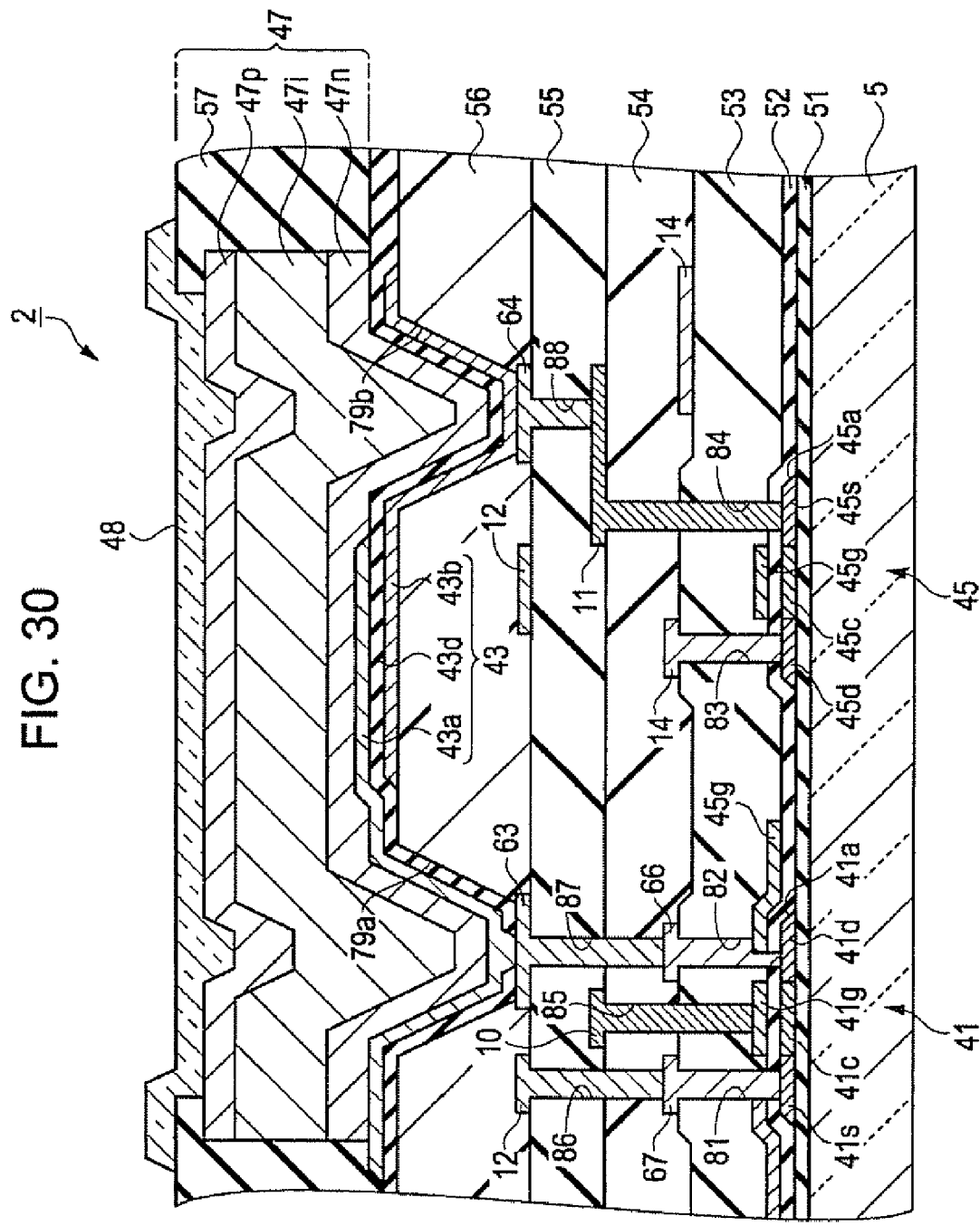
FIG. 30 is a cross-sectional view of the detection device, taken along the line XXX-XXX in FIG. 25.

FIG. 25 is a plan view of the detection device 2 that includes the plurality of pixel circuits 40 according to the present embodiment. FIG. 26 is an enlarged plan view of the pixel circuit 40. FIG. 30 is a cross-sectional view of the detection device 2, taken along the line XXX-XXX in FIG. 25. As shown in FIG. 30, each pixel circuit 40 includes a first layer, a second layer, a third layer, a fourth layer, and a fifth layer. The first layer includes the semiconductor layers 41a and 45a. The second layer includes the gate electrodes 41g and 45g. The third layer includes the detection line 14, and the like. The fourth layer includes the scanning line 10, the first power supply line 11, and the like. The fifth layer includes the second power supply line 12, and the like. FIG. 27 is a plan view that shows the components of the first layer and the fifth layer among the components shown in FIG. 25. FIG. 28 is a plan view that shows the components of the first layer and the second layer among the components shown in FIG. 25. FIG. 29 is a plan view that shows the components of the first layer, the third layer and the fourth layer among the components shown in FIG. 25.

First, the configuration of the pixel circuit 40 will be described with reference to the cross-sectional view shown in FIG. 30. On the substrate 5, the base insulating film 51 made of silicon oxide, or the like, is formed. The first layer includes the semiconductor layers 41a and 45a and is formed on the base insulating film 51. The gate insulating film 52 made of silicon oxide, or the like, is formed on the first layer. The second layer includes the gate electrodes 41g and 45g and is formed on the first layer.

The semiconductor layer 41a is, for example, formed of a polysilicon film, and includes the channel region 41c, the drain region 41d and the source region 41s. A channel is formed in the channel region 41c by an electric field applied from the gate electrode 41g. The drain region 41d serves as a first terminal. The source region 41s serves as a second terminal. Similarly, the semiconductor layer 45a includes the channel region 45c, the drain region 45d, and the source region 45s. A channel is formed in the channel region 45c by an electric field applied from the gate electrode 45g. The drain region 45d serves as a first terminal. The source region 45s serves as a second terminal. The semiconductor layers 41a and 45a each may have an LDD structure. The gate electrode 41g is at least formed in a region that overlaps the channel region 41c in plan view. The gate electrode 45g is at least formed in a region that overlaps the channel region 45c in plan view.

As shown in FIG. 28, the semiconductor layers 41a and 45a are arranged in a staggered manner with respect to the column direction. In addition, each of the semiconductor layers 41a and 45a is formed of a silicon film that is formed to extend across the boundary line of the adjacent two pixel circuits 40 and is symmetrical with respect to the longitudinal direction thereof. That is, each semiconductor layer 41a is formed so that the drain region 41d, the channel region 41c, the source region 41s, the channel region 41c and the drain region 41d are aligned in a line. The source region 41s is shared by the adjacent two pixel circuits 40 and is electrically connected to the second power supply line 12. Similarly, each semiconductor layer 45a is formed so that the drain region 45d, the channel region 45c, the source region 45s, the channel region 45c and the drain region 45d are aligned in a line. The source region 45s is shared by the adjacent two pixel circuits 40 and is electrically connected to the first power supply line 11. In the above description, the channel region 41c is a region that overlaps the gate electrode 41g of the semiconductor layer 41a. Similarly, the channel region 45c is a region that overlaps the gate electrode 45g of the semiconductor layer 45a. According to the above configuration, because it is possible to reduce the number of contacts between both the semiconductor layers 41a and 45a and wirings, it is possible to improve the yields in a manufacturing process.

In addition, the semiconductor layers 41a and the semiconductor layers 45a are arranged parallel to each other. That is, the semiconductor layers 41a are provided so as to extend in a direction in which the semiconductor layers 45a extend. Thus, the direction of the channel length of each channel region 41c is oriented along the direction of the channel length of each channel region 45c. Alternatively, the direction of the channel length of each channel region 41c may be parallel to the direction of the channel length of each channel region 45c. According to the above configuration, because each set of the channel region 41c and the channel region 45c may be arranged in a minimum area, it is possible to arrange the amplifier transistors 45 and the reset transistors 41 in high density. In addition, when the semiconductor layers 41a and 45a are formed of low temperature polysilicon that is formed through laser annealing, it is advantageous in that the transistor characteristics may be controlled using the size of each of the channel regions 41c and 45c. Particularly, when the semiconductor layers 41a and 45a are formed of low temperature polysilicon, it is possible to uniform the current characteristics of the amplifier transistors 45 and the reset transistors 41. Thus, it is possible to, for example, uniform an on electric or an off electric current between the amplifier transistor 45 and the reset transistor 41. In the detection device 2, when a certain pixel circuit 40 is kept inoperative, both the amplifier transistor 45 and the reset transistor 41 must be reliably held in an off state. According to the above configuration, this operation may be easily performed.

In addition, as shown in FIG. 28, the channel length of each of the channel regions 41c and 45c is arranged so that the direction in which the channel length extends in plan view is perpendicular to the direction (row direction) in which the scanning line 10 (see FIG. 29) extends. According to the above configuration, the wirings in the column direction of the second power supply lines 12, the detection lines 14, and the like, may be formed to overlap the amplifier transistor 45 or the reset transistor 41. Thus, it is possible to arrange these components in high density.

In addition, each amplifier transistor 45 is formed so that both the drain region 45d (first terminal) and the source region 45s (second terminal) are arranged along a direction perpendicular to the direction (row direction) in which the scanning line 10 and the first power supply line 11 extend in plan view. Similarly, each reset transistor 41 is formed so that both the drain region 41d (first terminal) and the source region 41s (second terminal) are arranged along a direction perpendicular to the direction (row direction) in which the scanning line 10 and the first power supply line 11 extend in plan view. According to the above configuration, when wirings that extend in the row direction, that is, the scanning lines 10 and the first power supply lines 11, are arranged, the scanning lines 10 and the first power supply lines 11 may be linearly arranged while suppressing the area that overlaps the amplifier transistor 45 or the reset transistor 41 to the minimum amount. Thus, it is possible to prevent a signal delay due to complex wirings. In addition, when the low temperature polysilicon is formed through laser annealing, it is possible to easily perform annealing on the semiconductor layers 41a and 45a with a linear laser beam that is parallel to the column direction of the pixel circuits 40. The electrical characteristics of the semiconductor layers 41a and 45a strongly depend on a crystal orientation. Particularly, in the case of laser annealing, this dependency is remarkable depending on the direction in which laser is irradiated. Thus, according to the configuration of the present embodiment, the semiconductor layers 41a and 45a, of which the electrical characteristics are highly uniform, may be obtained.

In addition, as shown in FIG. 28, in each of the pixel circuits 40, the channel region 45c of the amplifier transistor 45 and the channel region 41c of the reset transistor 41 are arranged in a staggered manner with respect to the column direction. Similarly, the contacts between both the amplifier transistors 45 and the reset transistors 41 and various wirings are also arranged in a staggered manner with respect to the column direction. In other words, the channel region 45c of each of the amplifier transistors 45 and the channel region 41c of a corresponding one of the reset transistors 41 are arranged along a direction that makes a certain angle with the direction in which the scanning lines 10 extend in plan view. According to the above configuration, when wirings in the row direction, that is, the scanning lines 10 and the first power supply lines 11, are connected to the channel regions 41c and 45c, the drain regions 41d and 45d, or the source regions 41s and 45s, it is not necessary to complexly bend these wirings in the row direction but it is possible to linearly arrange the wirings in the row direction. Thus, it is possible to prevent a signal delay due to complex wirings.

In addition, each gate electrode 45g is provided so as to extend to a position that overlaps the drain region 41d of the reset transistor 41 in plan view, and is electrically connected through a contact hole 82 to the drain region 41d. In this manner, the amplifier transistor 45 may be controlled using the output of the reset transistor 41. The semiconductor layers 41a and 45a are arranged as described above, so that each drain region 41d is located on a line segment that extends from the channel region 45c in the minor axis direction of the semiconductor layer 45a. Thus, the gate electrode 45g simply extends from the area on the channel region 45c in the minor axis direction of the semiconductor layer 45a and, therefore, may be formed easily to the area on the drain region 41d. In addition, it is possible to ensure a wide contact portion in the drain region 41d. Then, the gate electrode 45g is linearly arranged along the direction in which the scanning line 10 extends. In this manner, the wirings other than the gate electrode 45g may also be easily arranged linearly in a direction along the scanning line 10. Thus, it is possible to prevent a signal delay due to complex wirings.

Referring back to FIG. 30, on the second layer, the third layer that includes the detection line 14, and the like, is formed through the interlayer insulating film 53 made of silicon oxide, or the like. In addition, relay electrodes 66 and 67 are also formed in the third layer. The detection line 14 is electrically connected to the drain region 45d of the amplifier transistor 45 through a contact hole 83, which is provided so as to extend through the interlayer insulating film 53 and the gate insulating film 52. The relay electrodes 66 and 67 are electrically connected to the drain region 41d and source region 41s of the reset transistor 41 through contact holes 81 and 82, which are provided so as to extend through the interlayer insulating film 53 and the gate insulating film 52.

The planar arrangement of the components of the third layer is shown in FIG. 29. Each detection line 14 is arranged parallel to the vertical direction (column direction) in the drawing, and is partly formed in a dogleg manner so as to avoid a contact hole 84 in which the first power supply line 11 is formed. Each relay electrode 66 is at least arranged in a region that overlaps the contact hole 82 within the drain region 41d of the reset transistor 41. Each relay electrode 67 is at least arranged in a region that overlaps the contact hole 81 within the source region 41s of the reset transistor 41.

Referring back to FIG. 30, on the third layer, the fourth layer that includes the scanning line 10, the first power supply line 11, and the like, is formed through the interlayer insulating film 54 made of silicon oxide, or the like. The scanning line 10 is electrically connected to the gate electrode 41g of the reset transistor 41 through a contact hole 85, which is provided so as to extend through the interlayer insulating films 54 and 53. The first power supply line 11 is electrically connected to the source region 45s of the amplifier transistor 45 through the contact hole 84, which is provided so as to extend through the interlayer insulating films 54 and 53 and the gate insulating film 52.

The planar arrangement of the components of the fourth layer is shown in FIG. 29. Each scanning line 10 is provided so as to extend along the horizontal direction (row direction) in the drawing, and is arranged so as to at least partly overlap the gate electrode 41g of the of the reset transistor 41 in plan view. In addition, as described above, the scanning line 10 and the gate electrode 41g of the reset transistor 41 are electrically connected through the contact hole 85, which is formed in the normal direction of the substrate 5 on the gate electrode 41g. In this manner, each scanning line 10 is arranged so as to cross over the two transistors in a layer that is different from the second layer or the third layer, and is connected to the gate electrode 41g in the normal direction to the substrate 5. Thus, it is not necessary to additionally provide a region for wiring the scanning lines 10, and a region for a wiring that connects the scanning line 10 and the reset transistor 41 is not required. Thus, it is possible to arrange the amplifier transistors 45 and the reset transistors 41 in high density.

Each first power supply line 11 is provided so as to extend along the horizontal direction (row direction) in the drawing, and is arranged so as to at least partly overlap the source region 45s of the amplifier transistor 45 in plan view. Here, each first power supply line 11 is formed at a position that is placed between any two adjacent rows among the rows of the pixel circuits 40. One first power supply line 11 is formed for each two adjacent rows. Then, each first power supply line 11 supplies power to the corresponding two adjacent rows of the pixel circuits 40. That is, each first power supply line 11 is shared by the adjacent rows of the pixel circuits 40. Furthermore, the components of the adjacent two pixel circuits 40 that are located on both sides of the first power supply line 11 are formed symmetrically with respect to the direction in which the first power supply line 11 extends. According to the above configuration, by minimizing the number of first power supply lines 11, it is possible to improve the density in which the pixel circuits 40 are arranged. That is, as compared with the configuration that two first power supply lines 11 are formed between the adjacent rows of the pixel circuits 40, because there is no need to provide a region in which the first power supply lines 11 are arranged, that is, space between two adjacent first power supply lines, it is possible to reduce the pitch at which the pixel circuits 40 are arranged. In addition, when the components of the pixel circuits 40 are arranged symmetrically, it is possible to reduce variation in the characteristics of the pixel circuits 40.

Referring back to FIG. 30, on the fourth layer, the fifth layer that includes the second power supply line 12 and the relay electrodes 63 and 64 is formed through the interlayer insulating film 55 made of silicon oxide, or the like. Each second power supply line 12 is electrically connected to the relay electrode 67 through a contact hole 86, which is provided so as to extend through the interlayer insulating films 55 and 54. Here, because the relay electrode 67 is connected to the source region 41s of the reset transistor 41, the second power supply line 12 is electrically connected to the source region 41s. The relay electrode 63 is electrically connected to the relay electrode 66 through a contact hole 87, which is provided so as to extend through the interlayer insulating films 55 and 54. The relay electrode 64 is electrically connected to the first power supply line 11 and, hence, the source region 45s of the amplifier transistor 45 through a contact hole 88, which is provided so as to extend through the interlayer insulating film 55.

The connecting portion at which the relay electrode 64 is connected to the first power supply line 11, that is, the position at which the contact hole 88 is formed, partly overlaps the detection line 14 in plan view. In this manner, according to the configuration of the present embodiment, it is possible to effectively use a region in the upper layer to the detection line 14. Thus, it is possible to form the pixel circuits 40 in high density.

The planar arrangement of the components of the fifth layer is shown in FIG. 27. Each second power supply line 12 extends along the vertical direction (column direction) in the drawing, and has branch portions, each of which is connected to the source region 41s of the reset transistor 41. As described above, because the source region 41s of the reset transistor 41 is shared by the adjacent two pixel circuits 40, it is possible to supply power to the two reset transistors 41 with one contact connected to the source region 41s.

Here, as shown in FIG. 25, the second power supply lines 12 and the detection lines 14 both are wirings that extend in the column direction, and the second power supply lines 12 and the detection lines 14 are formed in different layers from each other, that is, the second power supply lines 12 are formed in the fifth layer and the detection lines 14 are formed in the third layer. Thus, it is possible to arrange the second power supply lines 12 and the detection lines 14 so as to at least partly overlap each other in plan view. In the present embodiment, the second power supply lines 12 and the detection lines 14 are formed to partly overlap each other. According to the above configuration, because two kinds of wirings may be formed to overlap each other, it is possible to reduce the pitch at which the pixel circuits 40 are arranged in the row direction and, thereby, it is possible to form the pixel circuits 40 in high density.

Referring back to FIG. 30, a planarizing film 56 made of acrylic resin, or the like, is formed on the fifth layer, and the first capacitive element 43 and the photodiode 47, which serves as a detection element, are laminated in this order on the planarizing film 56. The first capacitive element 43 and the photodiode 47 are formed in each of the pixel circuits 40.

The first capacitive element 43 has such a structure that a second electrode 43b made of Al—Nd, or the like, an insulating film 43d made of silicon nitride, or the like, and a first electrode 43a made of Al—Nd, or the like, are laminated in this order from the lower layer side. The second electrode 43b is electrically connected to the relay electrode 64 through the contact hole 79b, which is formed in the planarizing film 56. Thus, the second electrode 43b is electrically connected to the source region 45s of the amplifier transistor 45 through the relay electrode 64 and the first power supply line 11. The contact hole 79b is formed in a region that overlaps the second electrode 43b in plan view. In addition, the first electrode 43a is electrically connected to the relay electrode 63 through a contact hole 79a, which is formed in the planarizing film 56. Thus, the first electrode 43a is electrically connected to the drain region 41d of the reset transistor 41 and the gate electrode 45g of the amplifier transistor 45 through the relay electrodes 63 and 66. The contact hole 79a is formed in a region that overlaps the first electrode 43a in plan view. Thus, according to the configuration that electrical connection is established by the contact holes 79a and 79b that are provided in the normal direction to the substrate 5, the connection may be reliably ensured, and line or space for wirings provided in the same layer may be increased. In addition, the first electrode 43a partly overlaps the semiconductor layer 41a in plan view, and the second electrode 43b partly overlaps the semiconductor layer 45a in plan view. With this feature as well, it is advantageous in that line or space for wirings provided in the same layer may be increased.

Furthermore, the connection of the first electrode 43a with the drain region 41d of the reset transistor 41 and the connection of the gate electrode 45g of the amplifier transistor 45 and the drain region 41d of the reset transistor 41 are established through the same contact hole 82 (common contact structure). According to the above configuration, it is possible to reduce regions used for the contacts in plan view, and it is possible to arrange the pixel circuits 40 in high density.

Each second electrode 43b is formed in a region, within the pixel circuit 40, except the drain region 41d of the reset transistor 41 and a region around the drain region 41d, and each first electrode 43a is formed over substantially the entire face of the pixel circuit 40.

Thus, the channel region 45c of the amplifier transistor 45 and the channel region 41c of the reset transistor 41 are covered with at least one of the first electrode 43a and the second electrode 43b in plan view. According to the above configuration, because the channel regions 45c and 41c may be shielded against light by one or two light shielding layers (the first electrode 43a and/or the second electrode 43b), it is possible to reduce an off electric current that flows through the amplifier transistor 45 or the reset transistor 41. In this manner, it is possible to improve the S/N ratio of the detection signal Xn.

The first electrode 43a of the first capacitive element 43 also serves as the cathode of the photodiode 47. The photodiode 47 has such a structure that the first electrode 43a, which serves as the cathode, an n layer 47n, an i layer 47i and a p layer 47p, which are made of amorphous silicon, and a transparent anode 47 made of ITO are laminated in this order from the lower layer side. The insulating layer 57 made of silicon nitride, or the like, is formed around the photodiode 47. Thus, according to the configuration that the first electrode 43a of the first capacitive element 43 also serves as the cathode of the photodiode 47 and the photodiode 47 is formed to overlap the first capacitive element 43, it is possible to increase an area occupied by the first capacitive element 43 and an area occupied by the photodiode 47.

Alternative Embodiment 2-1

Figure 31:
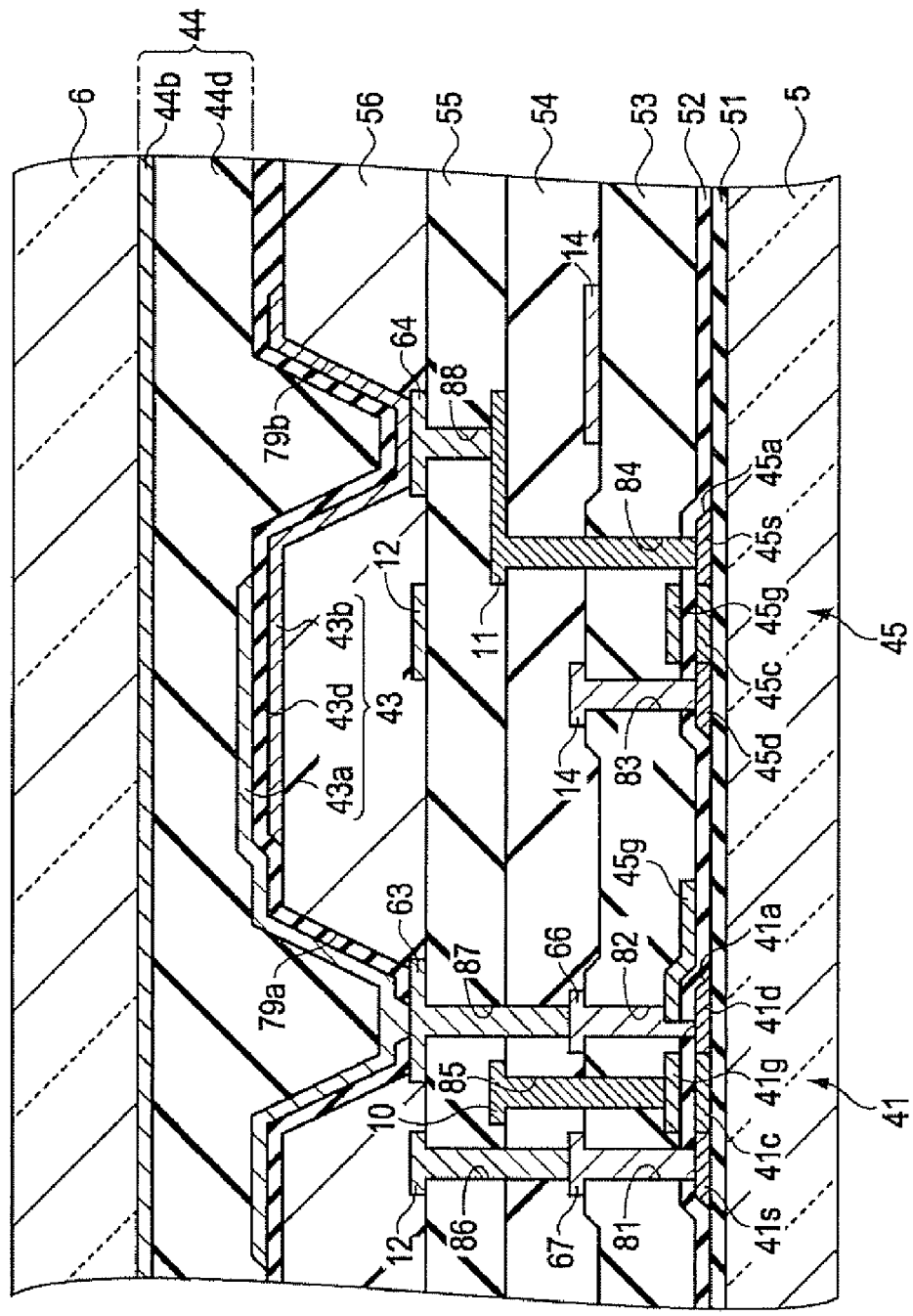
FIG. 31 is a cross-sectional view of the detection device that uses a second capacitive element as a detection element.

The detection device 2 according to the present embodiment uses the photodiode 47 as the detection element; however, various detection elements other than the photodiode 47 may be used. FIG. 31 is a cross-sectional view of the detection device 2 that uses the second capacitive element 44 as the detection element, in which the cross section is taken along the line XXX-XXX in FIG. 25. The second capacitive element 44 is formed so as to overlap the first capacitive element 43, and has such a structure that the first electrode 43a, an insulating layer 44d and a second electrode 44b are laminated from the lower layer side. Here, the first electrode 43a is shared with the first capacitive element 43. The substrate 6 made of glass, transparent resin, or the like, is arranged on the second capacitive element 44. As the substrate 6 is deformed because of an external factor, the thickness of the insulating layer 44d varies and, in accordance with the variation, the capacity of the second capacitive element 44 varies. As a result, the amount of charge stored in the second capacitive element 44 fluctuates and, therefore, the gate electric potential of the amplifier transistor 45 varies. In this manner, the second capacitive element 44 varies the gate electric potential of the amplifier transistor 45 depending on an external factor. Thus, even with the detection device 2 that uses the second capacitive element 44 as the detection element, it is possible to detect an external factor.

Alternative Embodiment 2-2

The detection device 2 according to the present embodiment includes two power supply lines (the first power supply line 11 and the second power supply line 12) in each pixel circuit 40; however, these power supply lines may be electrically connected to form a common power supply line and then each pixel circuit 40 may have a single power supply line. The circuit diagram of the detection device 2 that has the above constructed pixel circuits 40 is the same as that of the above alternative embodiment 1-2 and is shown in FIG. 22. With the above configuration as well, the same detection operation as in the case of the above embodiment may be performed.

Figure 32:
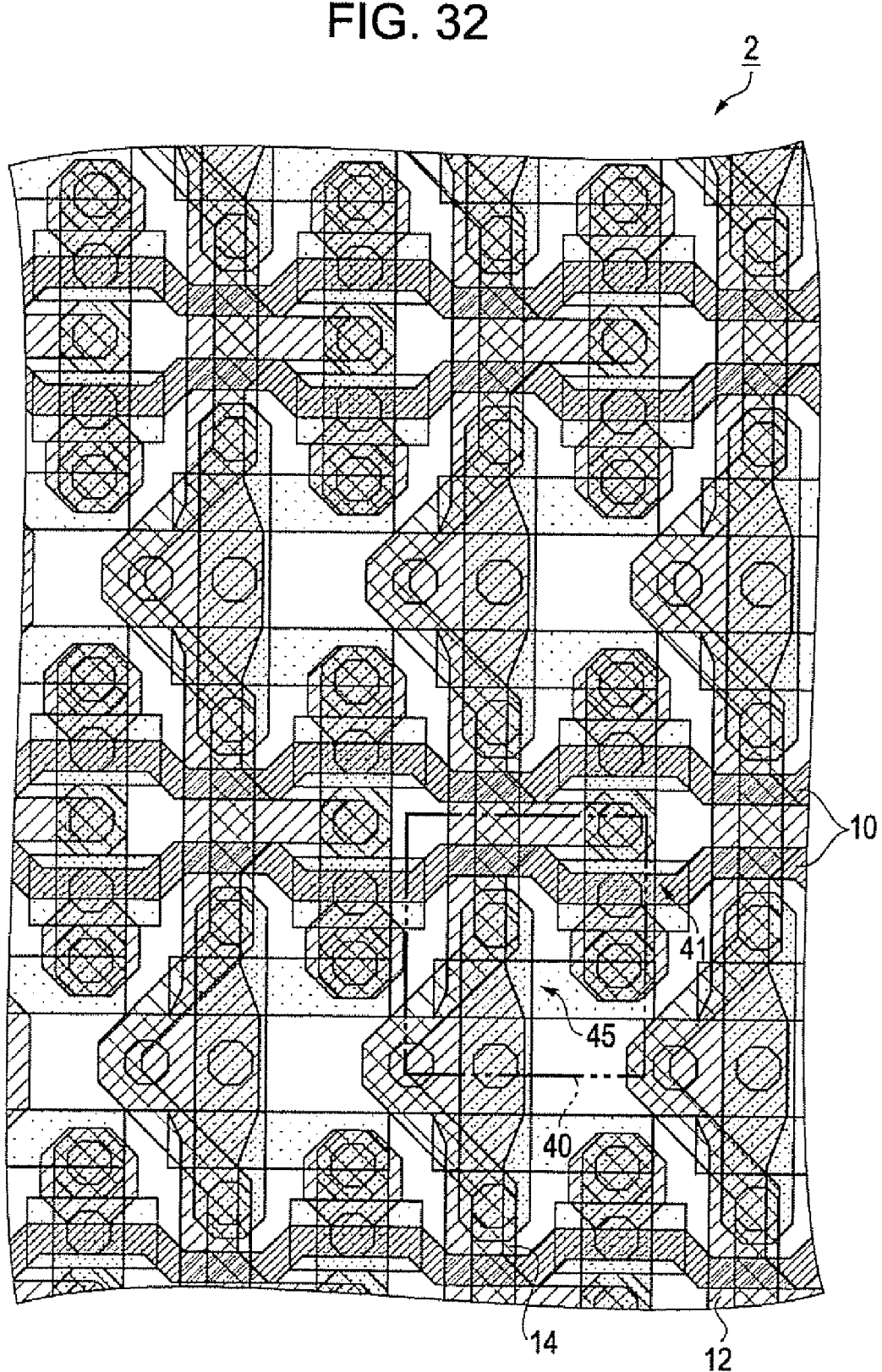
FIG. 32 is a plan view of the detection device in a region that includes a plurality of pixel circuits according to an alternative embodiment 2-2.
Figure 33:
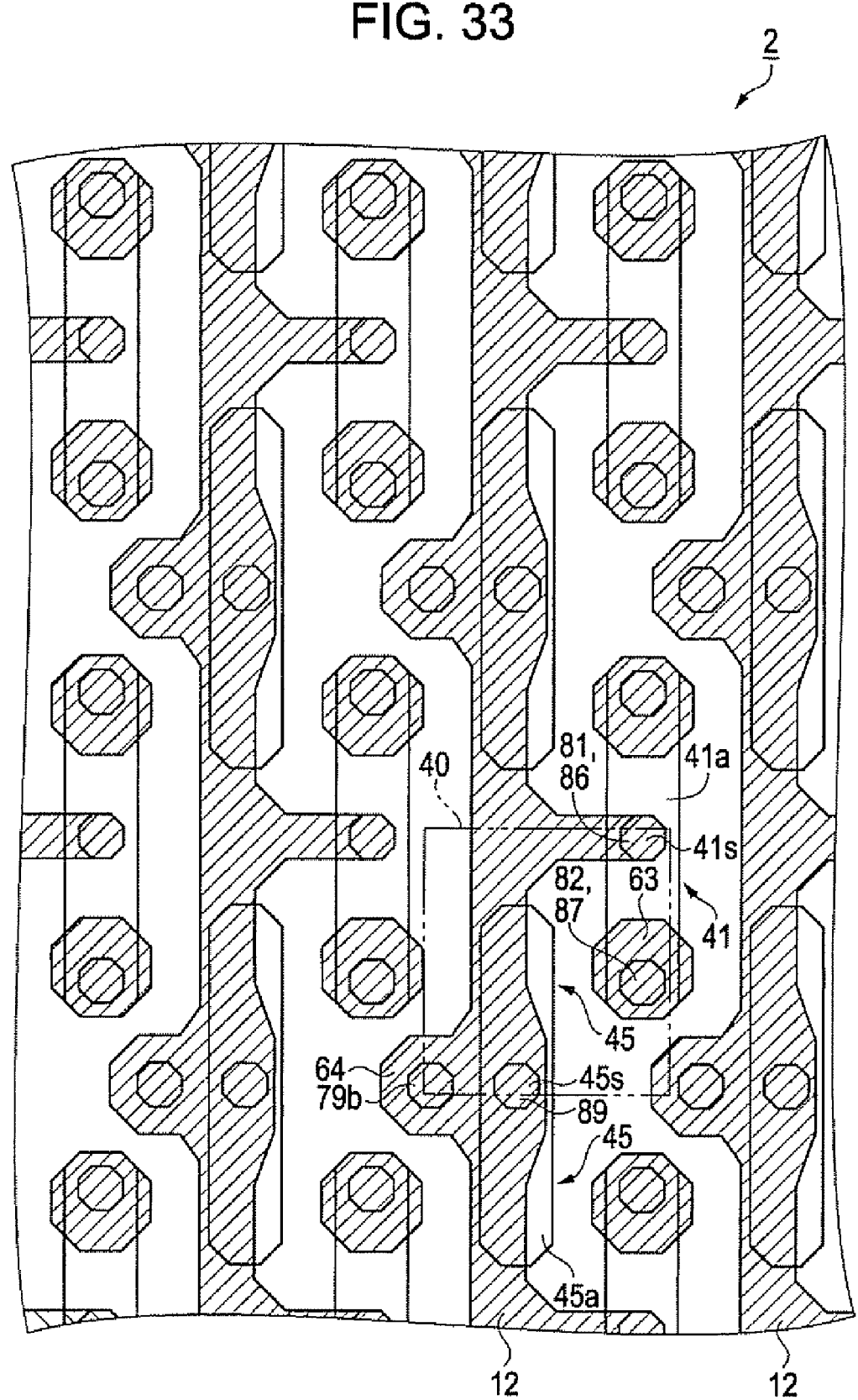
FIG. 33 is a plan view that shows the arrangement of a first layer and a fifth layer among the components shown in FIG. 32.

FIG. 32 is a plan view of the detection device 2 in a region that includes the plurality of pixel circuits 40 according to an alternative embodiment 2-2. In addition, FIG. 33 is a plan view that shows the arrangement of the first layer (layer in which the semiconductor layers 41a and 45a are formed) and the fifth layer (layer in which the power supply lines 12 are formed) among the components shown in FIG. 32. As shown in these drawings, the power supply lines 12 are arranged along the vertical direction (column direction) in the drawing. Each of the power supply lines 12 has branch portions that extend in a direction that intersects with the column direction. The branch portions are electrically connected to the contact holes 81, 86, 84 and 88. More specifically, each power supply line 12 is electrically connected through the contact holes 81 and 86 to the source region 41s and is electrically connected through the contact holes 89 to the source region 45s. Furthermore, each power supply line 12 is electrically connected to the second electrode 43b of the first capacitive element 43 at the position of the contact hole 79b.

The detection device 2 according to the present alternative embodiment does not include a first power supply line 11. Thus, it is possible to omit the first power supply line 11 from the fourth layer (see FIG. 29) that includes the first power supply lines 11 and the scanning lines 10 and which is provided in the second embodiment.

According to the configuration of the present alternative embodiment, because each pixel circuit (unit circuit) 40 includes only the single power supply line 12, it is possible to simplify the circuitry of the detection device 2 in comparison with the configuration that includes a plurality of power supply lines. In addition, because it is not necessary to form a plurality of power supply lines 12 in each pixel circuit 40 in different layers, it is possible to simplify the layer structure of each pixel circuit 40. Furthermore, the area in which the power supply lines 12 are arranged may be reduced and, hence, the pixel circuits 40 may be formed in further high density.

Electronic Apparatuses

Figure 34:
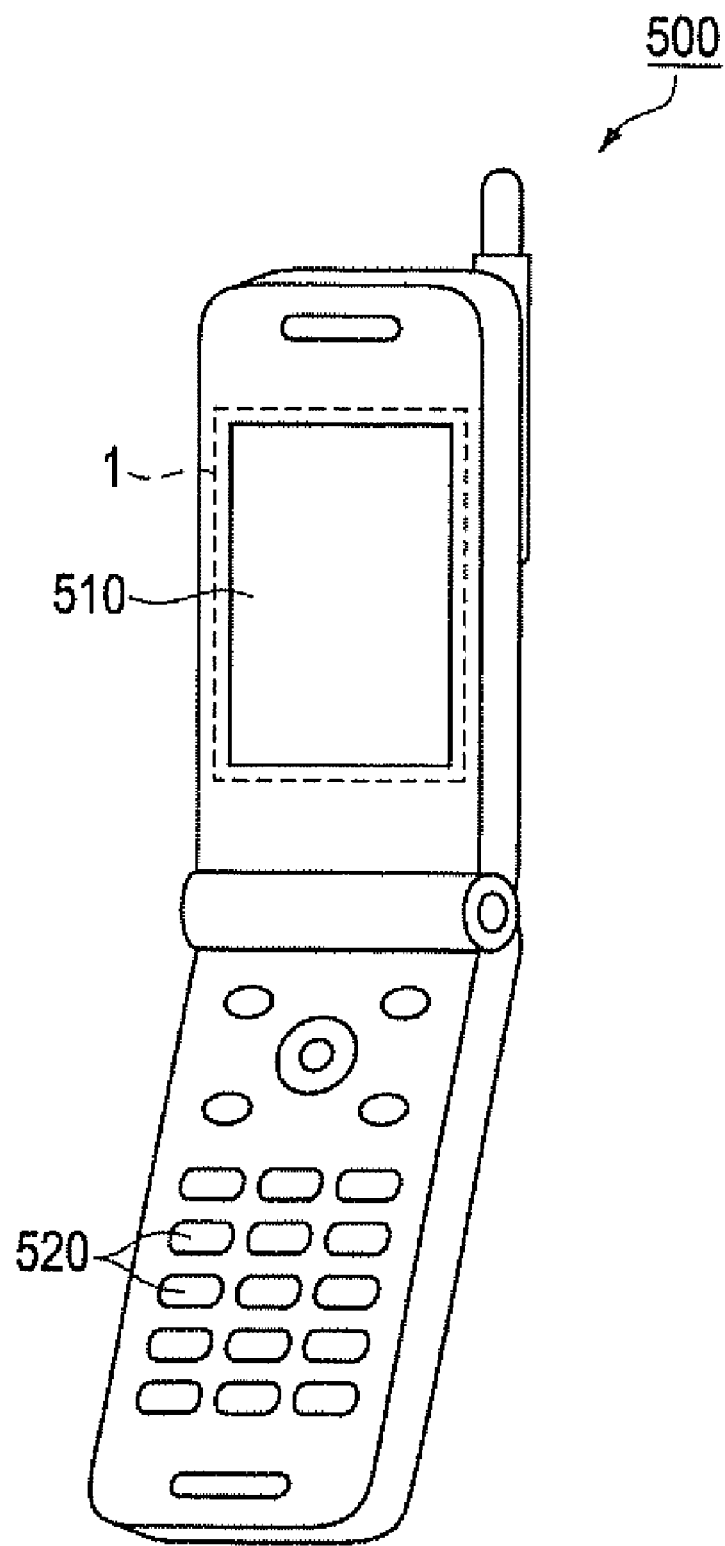
FIG. 34 is a perspective view of a cellular phone as an electronic apparatus.

The above described detection device 1 (or the detection device 2) may be, for example, used in such a manner that it is mounted on a cellular phone 500, which serves as an electronic apparatus, shown in FIG. 34. The cellular phone 500 includes a display portion 510 and operating buttons 520. The display portion 510 is able to display various pieces of information, such as contents that are input using the operating buttons 520 or received information. In addition, the display portion 510 incorporates the detection device 1 therein. When a touch pen, a finger, or the like, is brought close to the detection device 1, a variation in the amount of incident light is detected by the detection device 1 and then the positional information is input to the electronic apparatus. In this manner, the cellular phone 500 has a user interface that uses the detection device 1.

Note that the detection device 1 may be used not only in the above cellular phone 500 but also in various electronic apparatuses, such as a mobile computer, a digital camera, a digital video camera, an in-vehicle device, and an audio device. In addition, the detection device 1 may be applied to an image reading device, such as a scanner and an imaging device.

The entire disclosure of Japanese Patent Application Nos: 2007-164686, filed Jun. 22, 2007, 2007-164687, filed Jun. 22, 2007, 2007-164688, filed Jun. 22, 2007, 2007-164689, filed Jun. 22, 2007, 2008-018646, filed Jan. 30, 2008, 2008-018647, filed Jan. 30, 2008, 2008-018648, filed Jan. 30, 2008, and 2008-018649, filed Jan. 30, 2008 are expressly incorporated by reference herein.

What is claimed is:

1. A detection device comprising:
    a substrate;
    a plurality of scanning lines; a plurality of detection lines; a plurality of first power supply lines; a plurality of second power supply lines; and a plurality of unit circuits, which are arranged on the substrate, wherein the plurality of unit circuits are provided at positions corresponding to intersections of the scanning lines and the detection lines, wherein
    each of the unit circuits includes a first transistor, a detection element, a second transistor, and a first capacitive element, wherein
    the first transistor has a first terminal that is connected to a corresponding one of the detection lines and a second terminal that is connected to a corresponding one of the first power supply lines, and supplies the corresponding one of the detection lines with a detection signal corresponding to the electric potential of a gate electrode thereof, wherein
    the detection element is connected to the gate electrode of the first transistor and varies the electric potential of the gate electrode of the first transistor in accordance with an external factor, wherein
    the second transistor has a first terminal that is connected to the gate electrode of the first transistor and a second terminal that is connected to a corresponding one of the second power supply lines, and has a gate electrode that is connected to a corresponding one of the scanning lines, wherein
    the first capacitive element holds the electric potential of the gate electrode of the first transistor, wherein
    each of the scanning lines is formed in a layer that is different from a layer in which the gate electrode of the first transistor and the gate electrode of the second transistor are formed, and wherein
    each of the scanning lines is arranged so as to at least partly overlap the gate electrode of the second transistor in plan view.

2. The detection device according to claim 1, wherein the scanning lines and the gate electrodes of the second transistors are electrically connected through contact holes that are formed in a normal direction of the substrate on the gate electrodes of the second transistors.

3. The detection device according to claim 1, wherein a channel region of each first transistor and a channel region of each second transistor are arranged so as to make a certain angle with respect to a direction in which the scanning lines extend, and wherein each of the scanning lines is arranged so as to cross over the channel region of the first transistor and the channel region of the second transistor in plan view.

4. The detection device according to claim 1, wherein the detection lines and the second power supply lines are formed in different layers, and wherein each of the detection lines is arranged so as to extend along a direction in which the second power supply lines extend in plan view and at least partly overlap the second power supply line.

5. The detection device according to claim 1, wherein, among rows of the unit circuits, two of the first power supply lines that are arranged along the adjacent rows are formed in different layers from each other.

6. The detection device according to claim 1, wherein a direction of a channel length of each of the first transistors is oriented along a direction of a channel length of each of the second transistors.

7. The detection device according to claim 6, wherein the first transistors and the second transistors are arranged so that a direction of the channel length of each of the first transistors and the second transistors intersects with both a direction in which the scanning lines extend and a direction in which the detection lines extend in plan view.

8. The detection device according to claim 6, wherein the first terminals of the first transistors and the first terminals of the second transistors are aligned along a direction in which the scanning lines extend in plan view, and wherein
    the second terminals of the first transistors and the second terminals of the second transistors are aligned along a direction in which the scanning lines extend in plan view.

9. The detection device according to claim 6, wherein the first transistors and the second transistors are oriented so that a direction of the channel length of each of the first transistors and the second transistors is perpendicular to a direction in which the scanning lines extend in plan view.

10. The detection device according to claim 1, wherein each of the first capacitive elements includes a first electrode and a second electrode, and wherein
    the channel region of each of the first transistors and the channel region of each of the second transistors are covered with at least one of the first electrode and the second electrode in plan view.

11. The detection device according to claim 10, wherein each of the first electrodes also serves as an electrode of the detection element.

12. A detection device comprising:
    a substrate;
    a plurality of scanning lines; a plurality of detection lines; a plurality of first power supply lines; a plurality of second power supply lines; and a plurality of unit circuits, which are arranged on the substrate, wherein the plurality of unit circuits are provided at positions corresponding to intersections of the scanning lines and the detection lines, wherein
    each of the unit circuits includes a first transistor, a detection element, a second transistor, and a first capacitive element, wherein
    the first transistor has a first terminal that is connected to a corresponding one of the detection lines and a second terminal that is connected to a corresponding one of the first power supply lines, and supplies the corresponding one of the detection lines with a detection signal corresponding to the electric potential of a gate electrode thereof, wherein the detection element is connected to the gate electrode of the first transistor and varies the electric potential of the gate electrode of the first transistor in accordance with an external factor, wherein the second transistor has a first terminal that is connected to the gate electrode of the first transistor and a second terminal that is connected to a corresponding one of the second power supply lines, and has a gate electrode that is connected to a corresponding one of the scanning lines, wherein the first capacitive element holds the electric potential of the gate electrode of the first transistor, wherein among rows of the unit circuits, each of the first power supply lines is formed at a position that is placed between the two adjacent rows, and only one of the first power supply lines is formed for each two adjacent rows, and wherein each of the first power supply lines supplies power to the unit circuits of the corresponding two adjacent rows.

13. The detection device according to claim 12, wherein components of the two adjacent unit circuits that are placed on both sides of the corresponding one of the first power supply lines are formed symmetrically with respect to a direction in which the first power supply lines extend.

14. The detection device according to claim 12, wherein channel regions of a pair of the first transistors in the two adjacent unit circuits that are placed on both sides of the corresponding one of the first power supply lines are continuously formed of a silicon film.

15. The detection device according to claim 12, wherein
a channel region of the second transistor is formed of a silicon film that is formed continuously across a boundary between the adjacent two unit circuits, and wherein
a pair of the second transistors that are formed in the adjacent two unit circuits have the common second terminal through which the pair of second transistors are electrically connected to the corresponding one of the second power supply lines.

16. A detection device comprising:
a substrate;
a plurality of scanning lines; a plurality of detection lines; a plurality of power supply lines; and a plurality of unit circuits, which are arranged on the substrate, wherein the plurality of unit circuits are provided at positions corresponding to intersections of the scanning lines and the detection lines, wherein
each of the unit circuits includes a first transistor, a detection element, a second transistor, and a first capacitive element, wherein the first transistor has a first terminal that is connected to a corresponding one of the detection lines and a second terminal that is connected to a corresponding one of the power supply lines, and supplies the corresponding one of the detection lines with a detection signal corresponding to the electric potential of a gate electrode thereof, wherein the detection element is connected to the gate electrode of the first transistor and varies the electric potential of the gate electrode of the first transistor in accordance with an external factor, wherein the second transistor has a first terminal that is connected to the gate electrode of the first transistor and a second terminal that is connected to a corresponding one of the power supply lines, and has a gate electrode that is connected to a corresponding one of the scanning lines, wherein the first capacitive element holds the electric potential of the gate electrode of the first transistor, wherein each of the scanning lines is formed in a layer that is different from a layer in which the gate electrode of the first transistor and the gate electrode of the second transistor are formed, and wherein each of the scanning lines is arranged so as to at least partly overlap the gate electrode of the second transistor in plan view.

17. The detection device according to claim 16, wherein
the detection lines and the power supply lines are formed in different layers, and wherein
each of the detection lines is arranged so as to extend along a direction in which the power supply lines extend in plan view and at least partly overlap the power supply line.

18. The detection device according to claim 16, wherein a direction of a channel length of each of the first transistors is oriented along a direction of a channel length of each of the second transistors.

19. The detection device according to claim 16, wherein
each of the first capacitive elements includes a first electrode and a second electrode, and wherein
the channel region of each of the first transistors and the channel region of each of the second transistors are covered with at least one of the first electrode and the second electrode in plan view.

20. An electronic apparatus comprising the detection device according to claim 1.

* * * * *